United States Patent
Yamashita et al.

(10) Patent No.: US 6,287,720 B1
(45) Date of Patent: *Sep. 11, 2001

(54) NONAQUEOUS BATTERY HAVING POROUS SEPARATOR AND PRODUCTION METHOD THEREOF

(75) Inventors: Masaya Yamashita, Machida; Shunsuke Oki, Kawasaki, both of (JP)

(73) Assignee: Asahi Kasei Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,092
(22) PCT Filed: Aug. 28, 1996
(86) PCT No.: PCT/JP96/02414
§ 371 Date: Dec. 12, 1997
§ 102(e) Date: Dec. 12, 1997
(87) PCT Pub. No.: WO97/08763
PCT Pub. Date: Mar. 6, 1997

(30) Foreign Application Priority Data

Aug. 28, 1996 (JP) ..................... 7-219036

(51) Int. Cl.[7] .............. H01M 2/16; H01M 2/18; H01M 10/40
(52) U.S. Cl. ............ 429/131; 429/144; 429/145; 429/246; 429/249; 429/251; 429/137; 29/623.5
(58) Field of Search ................ 429/129, 131, 429/132, 133, 136, 137, 142, 144, 145, 209, 218.1, 231.1, 212, 214, 215, 216, 246, 322, 232, 249, 251–254; 29/623.5

(56) References Cited

U.S. PATENT DOCUMENTS 3,736,186   5/1973   Liang .

(List continued on next page.)

FOREIGN PATENT DOCUMENTS

| 0836238A1 | 4/1998 | (EP) . |
|---|---|---|
| 56 160756A | 12/1981 | (JP) . |
| 59 169075A | 9/1984 | (JP) . |
| 63 126177A | 5/1988 | (JP) . |
| 1 27160A | 1/1989 | (JP) . |
| 3 105851A | 5/1991 | (JP) . |
| 3 283259A | 12/1991 | (JP) . |
| 5 234621A | 9/1993 | (JP) . |
| 6 251759A | 9/1994 | (JP) . |
| WO97 01870 | 1/1997 | (WO) . |

*Primary Examiner*—Stephen Kalafut
*Assistant Examiner*—Jonathan Crepeau
(74) *Attorney, Agent, or Firm*—Birch, Stewart, Kolasch & Birch, LLLP

(57) ABSTRACT

Disclosed is a battery comprising a positive electrode comprising a cathode active material layer, a negative electrode comprising an anode active material layer, and a sole porous separator disposed between the positive electrode and the negative electrode, wherein the positive electrode, the negative electrode and the separator are disposed in a casing containing an electrolyte, and wherein the porous separator comprises at least one layer of an aggregate form of particles of at least one insulating substance, the layer of the aggregate form of particles having a three-dimensional network of voids which function as pores of the porous separator and which are capable of passing ions therethrough.

16 Claims, 5 Drawing Sheets

U.S. PATENT DOCUMENTS

| | | | | |
|---|---|---|---|---|
| 4,144,301 | * | 3/1979 | Adams et al. | 264/126 |
| 4,283,469 | * | 8/1981 | Goebel et al. | 429/246 X |
| 4,707,422 | * | 11/1987 | De Neufville et al. | 429/48 |
| 5,344,724 | * | 9/1994 | Ozaki et al. | 429/94 |
| 5,620,812 | * | 4/1997 | Tahara et al. | 429/223 |
| 5,665,491 | * | 9/1997 | Tomiyama et al. | 429/194 |
| 5,681,665 | * | 10/1997 | Lee et al. | 429/59 |
| 5,824,434 | * | 10/1998 | Kawakami et al. | 429/209 |
| 5,869,208 | * | 2/1999 | Miyasaka | 429/224 |
| 5,882,721 | * | 3/1999 | Delnick | 427/77 |

* cited by examiner

FIG. 1 (A) (PRIOR ART)
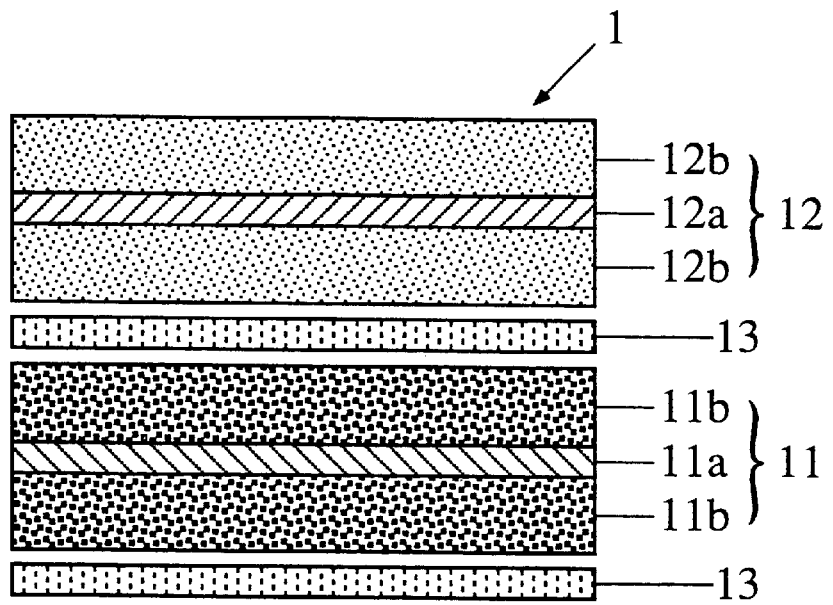
FIG. 1 (B) (PRIOR ART)
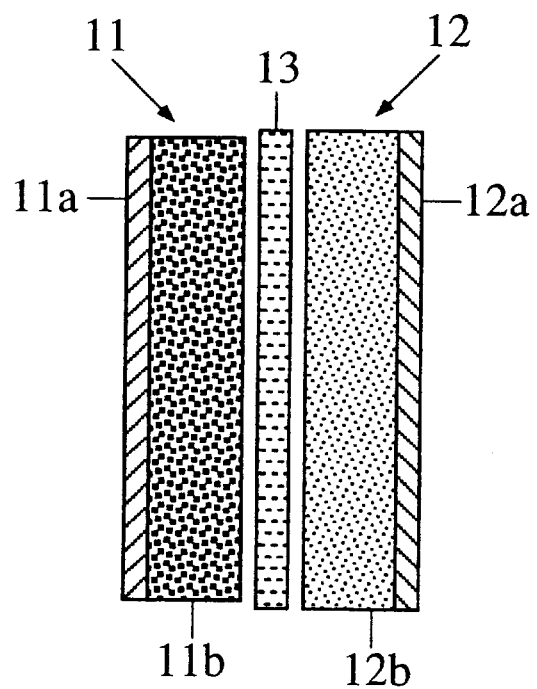

US 6,287,720 B1

NONAQUEOUS BATTERY HAVING POROUS SEPARATOR AND PRODUCTION METHOD THEREOF

This application claims the benefit under 35 U.S.C. §371 of prior PCT International Application No. PCT/JP96/02414 which has an International filing date of Aug. 28, 1996 which designated the United State of America, the entire contents of which are hereby incorporated by reference.

BACKGROUND OF THE INVENTION

1. Field of the Invention

The present invention relates to a novel battery and a method for producing the same. More particularly, the present invention is concerned with a non-aqueous secondary battery comprising a positive electrode comprising a cathode active material layer, a negative electrode comprising an anode active material layer, and a porous separator which is disposed between the positive electrode and the negative electrode and which is directly formed, in an immobilized form, on at least one active material layer selected from the group consisting of the cathode active material layer and the anode active material layer, wherein the positive electrode, the negative electrode and the separator are disposed in a casing containing an electrolyte, and wherein the porous separator comprises at least one layer of an aggregate form of particles of at least one insulating substance and a binder which is mixed with the particles to thereby bind the particles together, the layer of the aggregate form of particles having a three-dimensional network of voids which function as pores in the porous separator and which are capable of passing ions therethrough. The present invention is also concerned with a method for producing the above-mentioned novel battery. The battery of the present invention is advantageous not only in that the battery exhibits excellent discharge characteristics even at a high discharge current density without sacrificing safety, but also in that the amount of active materials which can be accommodated in the battery per unit volume thereof is large, as compared to the amounts in the case of conventional batteries.

2. Prior Art

In recent years, various demands have been made on electrical appliances, wherein the electrical appliances should be reduced in size and weight, wherein they should have multifunctionality and wherein they should be codeless (portable). For meeting these demands, development of high performance batteries has been vigorously studied. Batteries can be generally classified into primary batteries which are not rechargeable and secondary batteries which are rechargeable so that they can be repeatedly used. Examples of primary batteries include manganese dioxide batteries and an alkaline manganese dioxide dry cell. With respect to these primary batteries, various improvements have been made, and the primary batteries are used in a wide variety of fields. On the other hand, examples of secondary batteries include lead storage batteries, nickel-cadmium batteries and nickel-hydrogen batteries. Recently, a commercial demand for a secondary battery, particularly a lithium ion secondary battery using a non-aqueous electrolytic liquid has been increasing, since the lithium ion secondary battery can exhibit high voltage and high capacity even in a compact and lightweight form.

The performance of the above-mentioned batteries can be improved, for example, by increasing the amount of active materials and/or the amount of electrolyte which can be accommodated in a battery per unit volume of the battery, or by improving the ion conductive property between the positive electrode and the negative electrode.

Particularly, in the case of a battery using a non-aqueous electrolytic liquid (such a battery is hereinafter, frequently, referred to simply as a "non-aqueous battery"), such as the above-mentioned lithium ion secondary battery, since the non-aqueous liquid used in such a battery has a poor ion conductive property as compared to an aqueous electrolytic liquid, it is desired to improve the ion conductive property between the positive electrode and the negative electrode. For this purpose, generally, such a battery is designed to have a construction in which a plurality of unit cells (each comprising a positive electrode, a negative electrode and a separator) are laminated, or a construction in which a unit cell is spirally wound into a spirally wound structure, so as to increase the effective area of electrodes, at which the positive electrode and the negative electrode face each other. However, a satisfactory improvement in the ion conductive property has not yet been achieved.

As an example of the most effective methods for achieving an improvement in the ion conductive property, there can be mentioned a method in which a separator having a small thickness and an excellent ion permeability is used.

As a separator used in a conventional battery, generally, use is made of a microporous film made of a polyolefin resin, such as polyethylene or polypropylene. For example, as described in Unexamined Japanese Patent Laid-Open Specification No. 3-105851, the above-mentioned microporous film can be produced by a method in which a molten mixture comprising a polyolefin resin composition is extrusion-molded into a sheet, substances other than the polyolefin resin are removed from the sheet by extraction, and the resultant sheet is subjected to stretching.

The above-mentioned resin film separator needs to have a mechanical strength such that occurrence of the breakage of the separator can be avoided during the production of a battery. Due to such a required mechanical strength, it is difficult to reduce the thickness of the separator to less than a certain thickness. Therefore, in the case of the above-mentioned non-aqueous battery (such as a lithium ion secondary battery) having a construction in which a plurality of unit cells are laminated, or a construction in which a unit cell is spirally wound into a spirally wound structure, the amount of the unit cell which can be accommodated in the battery per unit volume thereof inevitably becomes small due to the restriction in respect of reduction of the thickness of the separator. Further, even when it is attempted to improve the ion conductive property between the positive electrode and the negative electrode by increasing the porosity of the conventional resin film separator, satisfactory results cannot be obtained (see Comparative Example 1 of the present specification) (the reason for this has not yet been elucidated). The above-mentioned separator made of a resin film is also disadvantageous in that the resin film separator has poor durability. Therefore, when such a separator is used in a secondary battery, the separator is deteriorated during the repetition of the charge/discharge operations, so that the cycle characteristics of the battery become poor (see Comparative Example 3 of the present specification). Further, in a battery using a conventional separator, use must be made of a large amount of the separator which is produced by the above-mentioned cumbersome, costly method, so that the ratio of the cost for the separator to the total cost for the battery becomes relatively high. Therefore, especially in the case of the above-mentioned non-aqueous battery, such as the lithium ion secondary battery, in which the conventional resin film separator is used, a large area of separator is needed due to the above-mentioned unique construction of such a battery and the cost for the separator becomes disadvantageously high, thereby rendering high the production cost for the battery.

SUMMARY OF THE INVENTION

The present inventors have made extensive and intensive studies with a view toward developing a battery which is free from the above-mentioned problems and which not only has high performance and high safety, but also can be produced at low cost. As a result, it has unexpectedly been found that a specific non-aqueous secondary battery as defined below is advantageous not only in that the battery exhibits excellent discharge characteristics even at a high discharge current density without sacrificing safety, but also in that a large amount of active material can be accommodated in the battery per unit volume thereof, as compared to the amounts in the case of conventional batteries. Such a specific battery comprises a positive electrode comprising a cathode active material layer, a negative electrode comprising an anode active material layer, and a porous separator which is disposed between the positive electrode and the negative electrode and which is directly formed, in an immobilized form, on at least one active material layer selected from the group consisting of the cathode active material layer and the anode active material layer, wherein the positive electrode, the negative electrode and the separator are disposed in a casing containing an electrolyte, and wherein the porous separator comprises at least one layer of an aggregate form of particles of at least one insulating substance and a binder which is mixed with the particles to thereby bind the particles together the layer of the aggregate form of particles having a three-dimensional network of voids which function as pores in the porous separator and which are capable of passing ions therethrough. The present invention has been completed, based on the above novel findings.

Accordingly, it is a primary object of the present invention to provide a high-performance battery which is advantageous not only in that the battery exhibits excellent discharge characteristics even at a high discharge current density without sacrificing safety, but also in that a large amount of active material can be accommodated in the battery per unit volume thereof, as compared to the amounts in the case of conventional batteries.

It is another object of the present invention to provide an advantageous method for producing the above-mentioned high performance battery.

The foregoing and other objects, features and advantages of the present invention will be apparent from the following detailed description taken in connection with the accompanying drawings and the appended claims.

BRIEF DESCRIPTION OF THE DRAWINGS

In the drawings:

FIG. 1(A) is a diagrammatic cross-sectional view showing the structure of a unit cell of a conventional battery in which a conventional separator is used.

FIG. 1(B) is a diagrammatic cross-sectional view showing the structure of a unit cell of another conventional battery in which a conventional separator is used.

In FIGS. 1(A) to 7(C), like parts and portions are designated by like numerals.

DESCRIPTION OF THE REFERENCE NUMERALS

Figure 2:
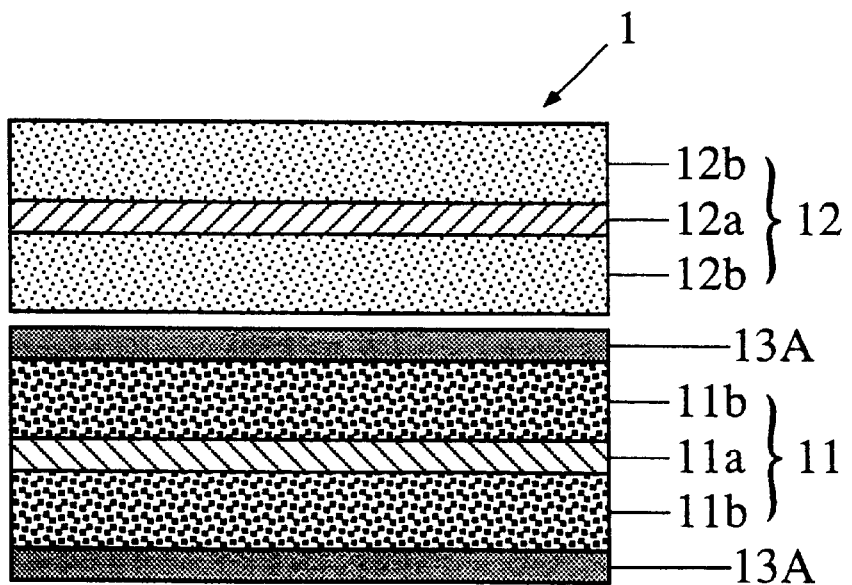
FIG. 2 is a diagrammatic cross-sectional view showing the structure of a unit cell of a battery according to one embodiment of the present invention.

1: Unit cell
11: Positive electrode
11a: Current collector foil for positive electrode
11b: Cathode active material layer
12: Negative electrode
12a: Current collector foil for negative electrode
12b: Anode active material layer
13: Conventional separator
13A: Separator used in the present invention, which is directly formed, in an immobilized form, on the surface of a cathode active material layer.
13B: Separator used in the present invention, which is directly formed, in an immobilized form, on the surface of an anode active material layer.
13C: Separator used in the present invention, which is directly formed, in an immobilized form, on each of the surface of a cathode active material layer and the surface of an anode active material layer.

DETAILED DESCRIPTION OF THE PRESENT INVENTION

Essentially, according to the present invention, there is provided a non-aqueous secondary battery comprising:

a non-aqueous electrolyte contained in the casing, a positive electrode comprising a cathode active material layer, a negative electrode comprising an anode active material layer, and a porous separator disposed between the positive electrode and the negative electrode, wherein two opposite surfaces of the porous separator face the cathode active material layer and the anode active material layer, respectively, the positive electrode, the negative electrode and the separator being disposed in the casing, operatively with the electrolyte, the porous separator comprising at least one layer of an aggregate form of particles of at least one insulating substance and a binder which is mixed with the particles to thereby bind the particles together, which porous separator is directly formed, in an immobilized form, on at least one active material layer selected from the group consisting of the cathode active material layer and the anode active material layer, wherein the at least one layer of the aggregate form of particles has a three-dimensional network of voids which function as pores in the porous separator and which are capable of passing ions therethrough.

For an easy understanding of the present invention, the essential features and various preferred embodiments of the present invention are enumerated below.

1. A non-aqueous secondary battery comprising:
   a casing,
   a non-aqueous electrolyte contained in the casing,
   a positive electrode comprising a cathode active material layer,
   a negative electrode comprising a anode active material layer,
   a porous separator disposed between the positive electrode and the negative electrode, wherein two opposite surfaces of the porous separator face the cathode active material layer and the anode active material layer, respectively,
   the positive electrode, the negative electrode and the separator being disposed in the casing, operatively with the electrolyte,
   the porous separator comprising at least one layer of an aggregate form of particles of at least one insulating substance and a binder which is mixed with the particles to thereby bind the particles together, which porous separator is directly formed, in an immobilized form, on at least one active material layer selected from the group consisting of the cathode active material layer and the anode active material layer, wherein the at least one layer of the aggregate form of particles has a three-dimensional network of voids which function as pores in the porous separator and which are capable of passing ions therethrough.

2. The non-aqueous secondary battery, according to item 1 above, wherein the porous separator has a porosity of 10% or more as measured in the dry state of the porous separator.

3. The non-aqueous secondary battery according to item 1 or 2 above, wherein the porous separator has an ion conductive property ascribed to a factor other than the voids of the aggregate form of particles.

4. The non-aqueous secondary battery according to item 1 or 3 above, wherein the insulating substance is an inorganic substance.

5. The non-aqueous secondary battery according to item 1 or 3 above, wherein the insulating substance is an organic substance.

6. The non-aqueous secondary battery according to item 1 or 5 above, wherein the aggregate form of particles comprises particles of at least two different insulating substances.

7. The non-aqueous secondary battery according to item 1 or 6 above, wherein the porous separator comprises at least two layers respectively comprised of different aggregate forms of particles.

8. The non-aqueous secondary battery according to item 1 or 7 above, wherein the separator comprises a first separator layer comprising at least one layer of an aggregate form of particles of at least one inorganic insulating substance and a second separator layer comprising at least one layer of an aggregate form of particles of at least one organic insulating substance, the first separator layer being directly formed, in an immobilized form, on one active material layer selected from the cathode active material layer and the anode active material layer, the second separator layer being directly formed, in an immobilized form, on the other active material layer remaining between the cathode active material layer and the anode active material layer.

9. The non-aqueous secondary battery according to item 1 or 8 above, wherein the non-aqueous electrolyte contains lithium ions.

10. The non-aqueous secondary battery according to item 1 or 9 above, wherein the cathode active material layer comprises lithium manganate.

11. A method for producing a non-aqueous secondary battery, comprising:
   (1) individually providing a positive electrode comprising a cathode active material layer and a negative electrode comprising an anode active material layer;
   (2) coating a dispersion of a mixture of particles of at least one insulating substance and a binder for the particles in a dispersion medium on at least one active material layer selected from the group consisting of the cathode active material layer and the anode active material layer;
   (3) removing, by evaporation, the dispersion medium of the dispersion coated on the at least one active material layer to form a layer of an aggregate form of the particles, wherein the particles are bound together by means of the binder, thereby providing a porous separator formed directly, in an immobilized form, on the at least one active material layer, wherein the layer of an aggregate form of particles has a three dimensional network of voids; and
   (4) disposing the positive electrode and the negative electrode, at least one of which has the porous separator formed on the active material layer thereof, in a casing so that the cathode active material layer and the anode active material layer are arranged, operatively with a non-aqueous electrolyte contained in the casing, in a positional relationship opposite to each other through the porous separator formed on the at least one active material layer.

In the battery of the present invention, the porous separator used therein, which comprises an aggregate form of particles of at least one insulating substance, has a unique pore structure formed by a three-dimensional network of voids formed in the aggregate form of the particles, so that the separator allows the ions to be transmitted through the electrolyte contained in the pores of the separator, while preventing occurrence of short-circuiting between the cathode active material layer and the anode active material layer. The separator used in the present invention has high ion permeability as compared to the conventional polyolefin resin film separator. The reason for this is considered to be as follows. In the porous separator used in the present invention, the above-mentioned unique pore structure formed by the three-dimensional network of voids formed in the aggregate form of particles is more effective for achieving high ion permeability than the pore structure of the conventional polyolefin resin film separator or the like.

The above-mentioned insulating substance may be either an inorganic substance or an organic substance. Examples of inorganic substances include oxides, (e.g., $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$ and $TiO_2$), zeolite (e.g., $M_{2/n}O \cdot Al_2O_3 \cdot xSiO_2 \cdot yH_2O$, wherein M represents a metal atom, such as Na, K, Ca and Ba; n is a number corresponding to the electric charge of a positive ion $M^{n+}$ of the metal atom M; x and y are the molar number of $SiO_2$ and the molar number of $H_2O$, respectively, and wherein $2 \leq x \leq 10$, and $2 \leq y \leq 7$), nitrides (e.g., BN, AlN, $Si_3N_4$ and $Ba_3N_2$), silicon carbide (SiC), zircon ($ZrSiO_4$), salts of carbonic acids (e.g., $MgCO_3$ and $CaCO_3$), salts of sulfuric acids (e.g., $CaSO_4$ and $BaSO_4$), and composites of the above-mentioned compounds {e.g., porcelains, such as steatite ($MgO.SiO_2$), forsterite ($2MgO.SiO_2$) and cordierite ($2MgO.2Al_2O_3.5SiO_2$)} Examples of organic substances include polyethylene, polypropylene, polystyrene, poly(vinyl chloride), poly (vinylidene chloride), polyacrylonitrile, poly(methyl methacrylate), polyacrylate, fluororesins {e.g., polytetrafluoroethylene and poly(vinylidene fluoride)}, polyamide resins, polyimide resins, polyester resins, polycarbonate resins, polyphenylene oxide resins, silicone resins, phenolic resins, urea resins, melamine resins, polyurethane resins, polyether resins {e.g., poly(ethylene oxide) and poly (propylene oxide)}, epoxy resins, acetal resins, acrylonitrile-styrene (AS) resins and acrylonitrile-butadiene-styrene (ABS) resins.

Generally, with respect to the particles of at least one insulating substance, it is preferred that the particles have high hardness. The use of a porous separator obtained using such particles having high hardness in a battery is advantageous for the following reason. Even when such a porous separator sustains a pressure caused by a volume increase of the active material layers, the porous separator is free from occurrence of a deformation of the pores, so that the porous separator does not suffer from a volume decrease of the pores. Therefore, the amount of the electrolyte contained in each pore of the porous separator can be constantly maintained at the same level, so that the porous separator does not suffer a lowering in the ion conductive property. Therefore, the battery using such a separator exhibits improved durability.

Further, with respect to the particles of at least one insulating substance, it is preferred to use an insulating substance having such a high heat resistance as represented by the melting point of 200° C. or more, for example $\alpha$-$Al_2O_3$ (melting point: 2055° C.) and polyimide resins (heat resistant resins which do not undergo dissolution, melting or decomposition at a temperature of from 250 to 400° C.). By the use of particles of such an insulating substance having high heat resistance, it becomes possible to obtain a separator having high heat resistance as compared to conventional separator materials, such as a polyethylene microporous film (melting point: about 140° C.) and a polypropylene microporous film (melting point: about 180° C.).

With respect to the average particle diameter of the above-mentioned particles of at least one insulating substance, it is preferred that the average particle diameter is from 5 nm to 100 $\mu$m, more preferably from 5 nm to 10 $\mu$m, most preferably from 5 nm to 1 $\mu$m.

With respect to the thickness of the above-mentioned porous separator, there is no particular limitation. However, it is preferred that the thickness of the separator is from 100 nm to 100 $\mu$m, more preferably from 100 nm to 10 $\mu$m.

In the present invention, it is preferred that the porous separator further comprises a binder which is mixed with the particles to thereby bind the particles together.

Examples of binders include latexes (e.g., a styrene-butadiene copolymer latex and an acrylonitrile-butadiene copolymer latex), cellulose derivatives (e.g., a sodium salt of carboxymethylcellulose), fluororubbers (e.g., a copolymer of vinylidene fluoride, hexafluoropropylene and tetrafluoroethylene) and fluororesins {e.g., poly(vinylidene fluoride) and polytetrafluoroethylene}.

With respect to the amount of the above-mentioned binder, it is preferred that the binder is used in an amount of from 1/500 to 5/3, more preferably from 1/500 to 1/2, most preferably from 1/500 to 1/5, in terms of the volume ratio of the binder to the particles of at least one insulating substance.

In the present invention, it is preferred that the porous separator used in the battery is directly formed, in an immobilized form, on at least one active material layer selected from the group consisting of the cathode active material layer and the anode active material layer.

With respect to the conventional battery, in which a microporous resin film is used as a separator, the separator needs to be handled as an independent film. Therefore, such a separator used in the conventional battery needs to have high mechanical strength so as to avoid breakage of the separator during the handling thereof. For this reason, it has conventionally been difficult to reduce the thickness of a separator to a level less than 25 $\mu$m. On the other hand, in the case of the battery of the present invention, which has a construction in which the separator is directly formed, in an immobilized form, on the active material layer, the separator need not be handled as an independent film during the production the battery, so that a separator having an extremely small thickness can be employed. Therefore, by the use of the above-mentioned construction, it becomes possible not only to increase the amount of active material which can be accommodated in the battery per unit volume thereof, but also to reduce the internal resistance of the battery (the low internal resistance of the battery has a favorable effect of lowering the overvoltage, thereby markedly improving the input/output characteristics of the battery).

It is preferred that the porosity of the above-mentioned porous separator is 10% or more, more preferably 20% or more, most preferably 40% or more, as measured in the dry state of the porous separator. With respect to the porosity of the porous separator, the higher the porosity, the higher the ion conductive property of the porous separator. Therefore, it is preferred that the porous separator has a porosity as high as possible. However, when the porosity of the porous separator is too high (especially, in the case of a porous separator having a small thickness), it is difficult to prevent occurrence of the short-circuiting between the positive electrode and the negative electrode. Therefore, from a practical point of view, it is preferred that the porosity of the porous separator is not higher than 90%.

The above-mentioned porosity of the porous separator can be measured as follows. In the case of a separator which is formed in an independent form, the porosity of the separator can be measured by means of a mercury porosimeter. On the other hand, in the case of a separator which is formed, in an immobilized form, on at least one active material layer and which cannot be separated from the active material layer(s), the porosity of such a separator can be determined by the following method. The separator is impregnated with a resin solution so as to fill the pores of the separator with the resin solution, followed by curing the resin. The resultant separator having pores thereof filled with the cured resin is cut to obtain a cross section of the separator in which the cross sections of the cured resin-filled pores are exposed. A photograph of the cross section thereof is taken by means of a scanning electron microscope (SEM). The obtained photograph of the cross section of the separator is examined to obtain the ratio (%) of the sum of the respective cross-sectional areas of the cured resin-filled pores to the entire area of the cross section of the separator. In practice, with respect to each of ten or more different cross-sectional portions of the separator which each include a number of cured resin-filled pores, the ratio (%) of the sum of the respective cross-sectional areas of the cured resin-filled pores to the entire area of the cross section of each of the different portions of the separator is obtained in substantially the same manner as mentioned above, and the average value of the obtained ratios is defined as the porosity of the separator.

In the present invention, the above-mentioned separator may have an ion conductive property attributed to a factor other than the voids of the aggregate form of particles of at least one insulating substance.

Examples of methods for obtaining such separators, which have an ion conductive property attributed to a factor other than the voids of the aggregate form of particles, include a method in which porous particles of at least one insulating substance are employed; a method in which use is made of particles of at least one insulating substance which has, in the skeletal structure thereof, voids which allow the molecules of the electrolyte to pass therethrough (e.g., a zeolite); a method in which use is made of particles of a material (e.g., polyacrylonitrile, poly(methyl methacrylate) and poly(vinylidene fluoride) which is swellable with an electrolytic liquid, wherein the swellable material is at least one insulating substance, a substance other than the insulating and the other substance, the other substance being used in the form of a mixture with the insulating substance; and a method in which use is made of a material, e.g., a composite of an alkaline metal salt with poly(ethylene oxide), poly(propylene oxide), a polyphosphazene or the like, namely a material obtained by impregnating a solid with a solution of an electrolyte in a solvent, and removing the solvent by evaporation from the impregnated solid, wherein the material is at least one insulating substance, a substance other than the insulating substance or a combination of the insulating substance and the other substance, the other substance being used in the form of a mixture with the insulating substance.

In the embodiment mentioned in item 6 above, use is made of a porous separator comprising an aggregate form of particles of at least two different insulating substances. In the embodiment mentioned in item 7 above, use is made of a porous separator comprising at least two layers respectively comprised of different aggregate forms of particles. In the embodiment mentioned in item 8 above, use is made of a porous separator comprising a first separator layer comprising at least one layer of an aggregate form of particles of at least one inorganic insulating substance and a second separator layer comprising at least one layer of an aggregate form of particles of at least one organic insulating substance. The term "different" used herein is intended to indicate that the chemical compositions are different and that the properties, such as melting point, are different despite the fact that the chemical compositions are the same. According to each of the above-mentioned embodiments, it is possible to impart the separator with the ability to function as a fuse. As an example of the batteries according to the embodiment of item 6 above there can be mentioned a battery in which the layer of an aggregate form of particles comprises a mixture of particles of an inorganic oxide having a high melting point (e.g., 1,000° C. or more) and particles of a resin having a low melting point (e.g., 200° C. or less). As an example of the batteries according to the embodiment of item 8 above, there can be mentioned a battery in which the separator comprises a first separator layer of an aggregate form of particles of an inorganic oxide having a high melting point (e.g., 1,000° C. or more) and a second separator layer of an aggregate form of particles of a resin having a low melting point (e.g., 200° C. or less), wherein the first separator layer is directly formed, in an immobilized form, on the cathode active material layer and the second separator layer is directly formed, in an immobilized form, on the anode active material layer. When the battery according to the embodiment of each of items 6 and 8 above is caused to have a high temperature, only the resin particles contained in the separator are melted and the resultant molten resin closes the voids of the separator to thereby shut off the current (i.e., the separator functions as a fuse), so that the safety of the battery can be secured.

With respect to the type of the battery of the present invention, there is no particular limitation, and the battery of the present invention may be, for example, a primary battery, such as a manganese dioxide-lithium battery and a graphite fluoride-lithium battery; a secondary battery using an aqueous electrolytic liquid, such as a lead storage battery, a nickel-cadmium battery and a nickel-hydrogen battery; or a secondary battery using a non-aqueous electrolytic liquid, such as a lithium ion secondary battery.

With respect to the casing usable in the battery of the present invention, there is no particular limitation. Examples of casings include a can made of aluminum, stainless steel, iron or nickel; a plated can made of iron; a casing formed from a material having a laminate structure; and a casing formed from a resin film.

In the case of a battery of the present invention which is a primary battery, the positive electrode, the negative electrode and the electrolyte may be those which are prepared by conventional techniques. For example, when the battery of the present invention is a manganese dioxide-lithium battery, use can be made of a positive electrode prepared using manganese dioxide, a negative electrode prepared using metallic lithium, and an electrolyte prepared by dissolving a lithium salt in an organic solvent. When the battery of the present invention is a graphite fluoride-lithium battery, use can be made of a positive electrode prepared using a graphite fluoride, the same negative electrode as in the above-mentioned manganese dioxide-lithium battery, and the same electrolyte as in the above-mentioned manganese dioxide-lithium battery.

Also, in the case of the battery of the present invention which is a secondary battery, the positive electrode, the negative electrode and the electrolyte may be those which are prepared by conventional techniques. For example, when the battery of the present invention is a lead storage battery, use can be made of $PbO_2$ as a cathode active material, Pb as an anode active material, and an aqueous solution of $H_2SO_4$ as an electrolytic liquid. When the battery of the present invention is a nickel-cadmium battery, use can be made of NiOOH as a cathode active material, Cd as an anode active material, and, as an electrolytic liquid, an aqueous solution of KOH which contains LiOH or NaOH in a small amount. When the battery of the present invention is a nickel-hydrogen battery, use can be made of the same cathode active material as in the nickel-cadmium battery, hydrogen (e.g., a metal alloy having hydrogen occluded therein) as an anode active material, and the same electrolytic liquid as in the above-mentioned nickel-cadmium battery.

With respect to the battery of the present invention, which is a lithium ion secondary battery, a detailed explanation is made below (the explanation is made mainly about the cathode active material, the anode active material, and the electrolyte).

In the lithium ion secondary battery, as a current collector for the positive electrode, for example, a metallic foil, such as an aluminum foil, a titanium foil, or a stainless steel foil, can be used. Of the above-mentioned metallic foils, an aluminum foil is preferred. As a current collector for the negative electrode, for example, a metallic foil, such as a copper foil, a nickel foil, or a stainless steel foil, can be used. Of the above-mentioned metallic foils, a copper foil is preferred.

In the lithium ion secondary battery, as a cathode active material, a composite metal oxide of Li and a transition metal (such as Co, Ni, Mn, and Fe), and a composite metal oxide of Li, a transition metal and a non-transition metal can be used. Examples of composite metal oxides include a lithium-containing composite metal oxide having a lamellar structure and having the ability to electrochemically intercalate and deintercalate Li ions. Examples of lithium-containing composite metal oxides include $LiCoO_2$ as disclosed in Unexamined Japanese Patent Application Laid-Open Specification No. 55-136131 (corresponding to U.S. Pat. No. 4,357,215); $Li_xNi_yCo_{(1-y)}O_2$ wherein $0 \leq x \leq 1$, and $0 \leq y \leq 1$, as disclosed in Unexamined Japanese Patent Application Laid-Open Specification No. 3-49155; and $Li_xMn_2O_4$ wherein $0 \leq x \leq 1$.

These compounds can be easily obtained by a calcination reaction of a lithium compound, such as lithium hydroxide, lithium oxide, lithium carbonate, lithium nitrate or the like, with a metal oxide, a metal hydroxide, a metal carbonate, a metal nitrate or the like and, if desired, with other metal compounds.

In the lithium ion secondary battery, as an anode active material, a carbonaceous material, such as a coke, a graphite, and an amorphous carbon, can be used. The above-mentioned carbonaceous material may be in various forms, such as crushed particles, lamellar particles and spherical particles. With respect to the type of carbonaceous material, there is no particular limitation, and various types of carbonaceous materials can be used. Examples of carbonaceous materials include a carbon or graphite material having a large surface area as disclosed in Unexamined Japanese Patent Application Laid-Open Specification No. 58-35881 (corresponding to U.S. Pat. No. 4,617,243), a calcination-carbonized product of a phenolic resin and the like as disclosed in Unexamined Japanese Patent Application Laid-Open Specification No. 58-209864, and a calcination-carbonized product of a condensed polycyclic hydrocarbon compound as disclosed in Unexamined Japanese Patent Application Laid-Open Specification No. 61-111907 (corresponding to U.S. Pat. No. 4,725,422).

With respect to the non-aqueous electrolytic liquid used in the lithium ion secondary battery, there is no particular limitation. The non-aqueous electrolytic liquid can be prepared by dissolving the electrolyte as mentioned below in an organic solvent. Examples of electrolytes include $LiClO_4$, $LiBF_4$, $LiAsF_6$, $CF_3SO_3Li$, $(CF_3SO_3)_2N.Li$, $LiPF_6$, $LiI$, $LiAlCl_4$, $NaClO_4$, $NaBF_4$, $NaI$, $(n-Bu)_4NClO_4$, $(n-Bu)_4NBF_4$ and $KPF_6$. It is preferred that the concentration of the electrolyte in the organic electrolytic liquid is from about 0.1 to about 2.5 mol/liter. Examples of organic solvents include ethers, ketones, lactones, nitrites, amines, amides, sulfur compounds, chlorinated hydrocarbons, esters, carbonates, nitro compounds, phosphoric ester compounds, and sulfolane compounds. Among the above-mentioned organic solvents, ethers, ketones, nitriles, chlorinated hydrocarbons, carbonates and sulfolane compounds are preferred, and cyclic carbonates are especially preferred. Representative examples of organic solvents include tetrahydrofuran, 2-methyltetrahydrofuran, 1,4-dioxane, anisol, monoglyme, acetonitrile, propionitrile, 4-methyl-2-pentanone, butyronitrile, valeronitrile, benzonitrile, 1,2-dichloroethane, γ-butyrolactone, dimethoxyethane, methyl formate, propylene carbonate, ethylene carbonate, diethyl carbonate, dimethyl carbonate, methyl ethyl carbonate, vinylene carbonate, dimethylformamide, dimethylsulfoxide, dimethylthioformamide, sulfolane, 3-methylsulfolane, trimethyl phosphate, triethyl phosphate, and mixtures thereof. The organic solvents usable in the present invention are not limited to those which are mentioned above.

With respect to a non-aqueous battery, such as the above-mentioned lithium ion secondary battery, the non-aqueous liquid used therein has a poor ion conductive property. Therefore, for the purpose of improving the efficiency of ion conduction between the positive electrode and the negative electrode, the conventional non-aqueous battery has a construction in which a plurality of unit cells as shown in FIG. 1(A) are laminated, or a construction in which a unit cell 1 as shown in FIG. 1(A) is spirally wound into a spirally wound structure. The above-mentioned unit cell 1 as shown in FIG. 1(A) comprises: positive electrode 11 comprising current collector foil 11a (for the positive electrode) having both surfaces thereof coated with respective cathode active material layers 11b, 11b; negative electrode 12 comprising current collector foil 12a (for the negative electrode) having both surfaces thereof coated with respective anode active material layers 12b, 12b; and resin film separator 13 disposed between cat hode active material layer 11b and anode active material layer 12b. As already mentioned above, the use of resin film separator 13 has the following disadvantage. Since resin film separator 13 needs to be handled as an independent film during the production of the battery, the separator needs to have high mechanical strength so as to avoid breakage of the separator during the handling thereof. Therefore, the resin film separator needs to have a relatively large thickness so as to achieve high mechanical strength, and it is difficult to use a resin film separator having a thickness of less than 25 μm in a battery. When such a separator having a relatively large thickness is used in the above-mentioned non-aqueous battery having a construction as mentioned above, the amount of the active materials which can be accommodated in the battery per unit volume thereof becomes small due to the relatively large thickness of the separator. In contrast, when the porous separator used in the present invention is employed for producing a non-aqueous battery having a construction as mentioned above instead of resin film separator 13, it becomes possible to obtain a high-performance battery, in which the amount of active material which can be accommodated in the battery per unit volume thereof is markedly increased and the ion conduction between the positive electrode and the negative electrode is markedly improved. Further, the above-mentioned conventional non-aqueous battery, in which the resin film separator is used, is also disadvantageous in that the resin film separator which is a relatively expensive component among the components of the battery needs to be used in a large amount, so that the production cost for the battery inevitably becomes high. On the other hand, the porous separator used in the present invention can be obtained at low cost. Therefore, by the use of the porous separator used in the present invention, it becomes possible to produce the above-mentioned high-performance battery at low cost.

With respect to the method for producing the porous separator used in the present invention, there is no particular limitation. The porous separator can be produced, for example, by the method described below with reference to FIG. 2. Separator 13A can be produced by a method comprising forming cathode active material layers 11b and 11b on both surfaces of current collector foil 11a for a positive electrode by a conventional method, to thereby obtain positive electrode 11; forming a layer of an aggregate form of particles of at least one insulating substance on the surface of each cathode active material layer 11b, which layer of the aggregate form of particles serves as separator 13A. Specific examples of methods for forming separator 13A include a method in which particles of at least one insulating substance are uniformly coated on the surface of each cathode active material layer 11b, followed by bonding the particles to the surface of each cathode active material layer 11b by means of a roll press, to thereby form a layer of an aggregated form of particles, which serves as separator 13A; and a method in which a dispersion of a mixture of particles of at least one insulating substance and a binder for the particles in a dispersion medium is uniformly coated in a predetermined thickness on the surface of each cathode active material layer 11b, followed by heating the coated dispersion to remove the dispersion medium by evaporation, to thereby form a layer of an aggregate form of particles which serves as separator 13A. In the case of the above-mentioned method in which a dispersion of the mixture of particles of at least one insulating substance and a binder is used, there is no particular limitation with respect to the dispersion medium as long as the following three requirements are satisfied; that is, (i) the particles of at least one insulating substance be insoluble in the dispersion medium, (ii) a binder for the particles be soluble in the dispersion medium, and (iii) the dispersion medium can be evaporated by heating at an appropriate temperature. Examples of dispersion media include ethyl acetate, ethylene glycol monoethyl ether (2-ethoxyethanol), 1-methyl-2-pyrrolidone (NMP), N,N-dimethylformamide (DMF), dimethyl sulfoxide (DMSO), tetrahydrofuran (THF) and water. With respect to the time and temperature for the removal of the dispersion medium by heating, there is no particular limitation, as long as the particles of the insulating substance are not deformed or melted. However, the removal of the dispersion medium by heating is generally conducted at a temperature of from 50 to 200° C. for 5 to 30 minutes. Further, with respect to the solids (particles of the insulating substance) content of the above-mentioned dispersion, there is no particular limitation. However, it is preferred that the solids content is from 40 to 60% by weight, based on the weight of the dispersion.

The porous separator obtained by the above-mentioned methods, in which the morphology of each of the particles constituting the aggregate form thereof is the same as that before the particles are fabricated into the aggregate from thereof, is fundamentally different from a separator obtained by a method in which particles of an insulating substance are heated to thereby melt-bond (sinter) the particles to each other. In the present invention, each of the particles constituting the aggregate form thereof maintains its original morphology (i.e., the morphology of the particle before the fabrication of the particles into the aggregated form thereof), in which the particles are not melt-bonded to each other and no chemical bond is formed between the particles.

When a unit cell having a structure as shown in FIG. 2 (which comprises a positive electrode having separators 13A, 13A on both sides thereof, and a negative electrode formed of a current collector 12a having anode active material layers 12b and 12b on both sides of current collector 12a) is used in the battery of the present invention, for example, such a unit cell can be used in the form of a spirally wound structure in which the unit cell is spirally wound so that the negative electrode of the wound unit cell is positioned on the side of the outer surface of each wind of the spirally wound structure, or in the form of a laminate structure in which a plurality of the unit cells are laminated so that each positive electrode 11 is positioned opposite to negative electrode 12 through separator 13A (i.e., in this laminate structure, each separator 13A is disposed between positive electrode 11 and negative electrode 12, wherein two opposite surfaces of the separator face cathode active material layer 11b and anode active material layer 12b, respectively).

As already mentioned above, with respect to separator 13A as shown in FIG. 2, which is directly formed, in an immobilized form, on the active material layer of the electrode, such a separator need not be handled as an independent film during the production of a battery. Therefore, the separator may have an extremely small thickness, and the lower limit of the thickness of the separator is not particularly limited as long as a predetermined porosity of the separator can be achieved and maintained, and occurrence of short-circuiting can be prevented. Separator 13A having an extremely small thickness can be obtained by using particles of the insulating substance having an appropriate average particle diameter. For example, by using particles of the insulating substance, which have an average particle diameter of 1 μm or less, separator 13A having a thickness of from 5 to 10 μm and a porosity of about 60% can be obtained.

Further, in the case of the above-mentioned separator 13A which is obtained by using a mixture of a binder and the particles of insulating substance, and which is directly formed, in an immobilized form, on the surface of an active material layer of an electrode, such a separator has high flexibility so that it continues to be stably positioned on the active material layer of the electrode without suffering slippage during the production of a battery. This is advantageous from the viewpoint of the efficiency in the production of a battery. It is difficult to obtain a separator having such high flexibility by a conventional technique, for example, by a method in which the particles of the insulating substance are melt-bonded (sintered) to each other to form a separator.

Next, in order to illustratively show the construction of the battery of the present invention, an explanation is made below about various embodiments of the present invention with reference to FIGS. 2 to 6.

Figure 3:
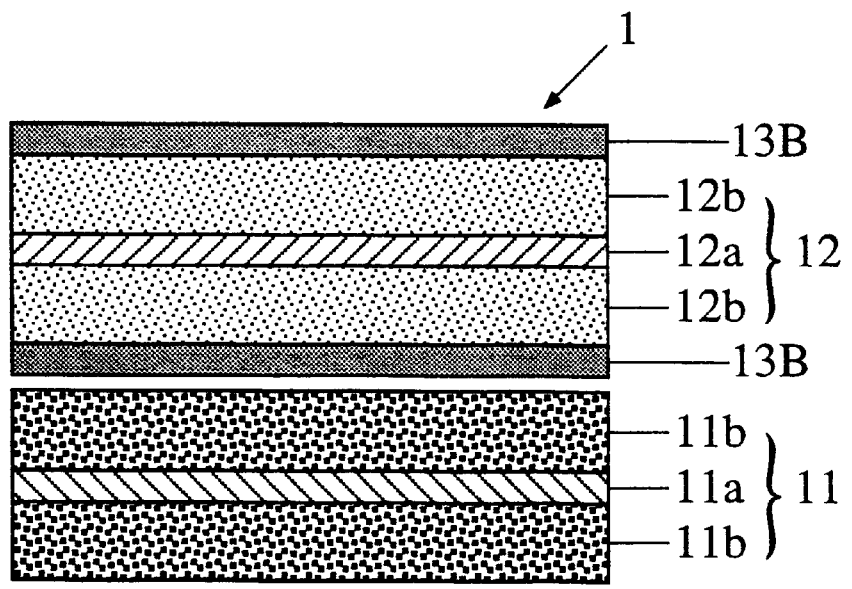
FIG. 3 is diagrammatic cross-sectional view showing the structure of a unit cell of a battery according to another embodiment of the present invention.

The unit cell shown in the above-mentioned FIG. 2, has a structure in which separators 13A, 13A are formed, in an immobilized form, on the respective cathode active material layers 11b, 11b which are formed on both surfaces of current collector foil 11a for positive electrode 11. Alternatively, the battery of the present invention may comprise a unit cell having a structure as shown in FIG. 3, in which separators 13B, 13B are formed, in an immobilized form, on the respective anode active material layers 12b, 12b which are formed on both surfaces of current collector foil 12a for negative electrode 12.

Figure 4:
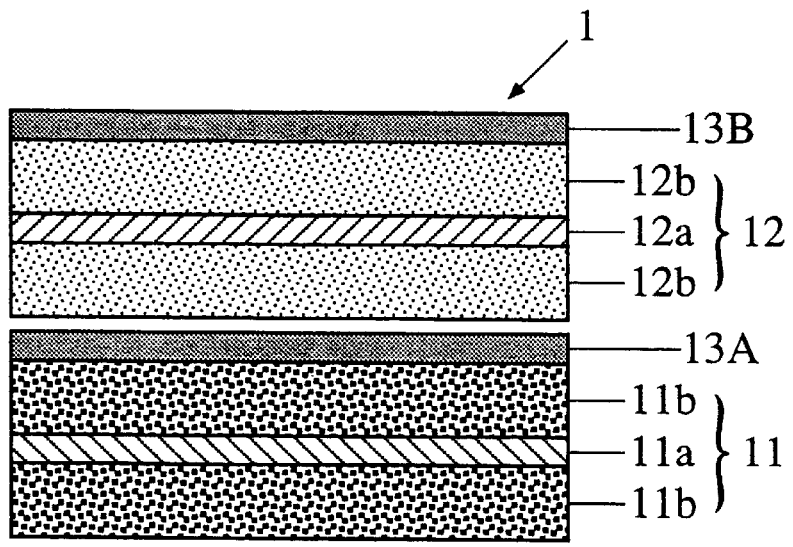
FIG. 4 is a diagrammatic cross-sectional view showing the structure of a unit cell of a battery according to still another embodiment of the present invention.

Further, the battery of the present invention may comprise a unit cell having a structure as shown in FIG. 4, in which separators 13A, 13B are respectively formed, in an immobilized form, on one of the two cathode active material layers 11b, 11b which are formed on both surfaces of current collector 12a for positive electrode 11, and on one of the two anode active material layers 12b, 12b which are formed on both surfaces of current collector 12a for negative electrode 12, wherein cathode active material layer 11b (having separator 13A formed thereon) and anode active material layer 12b (free of separator) are arranged opposite to each other through separator 13A.

Figure 5:
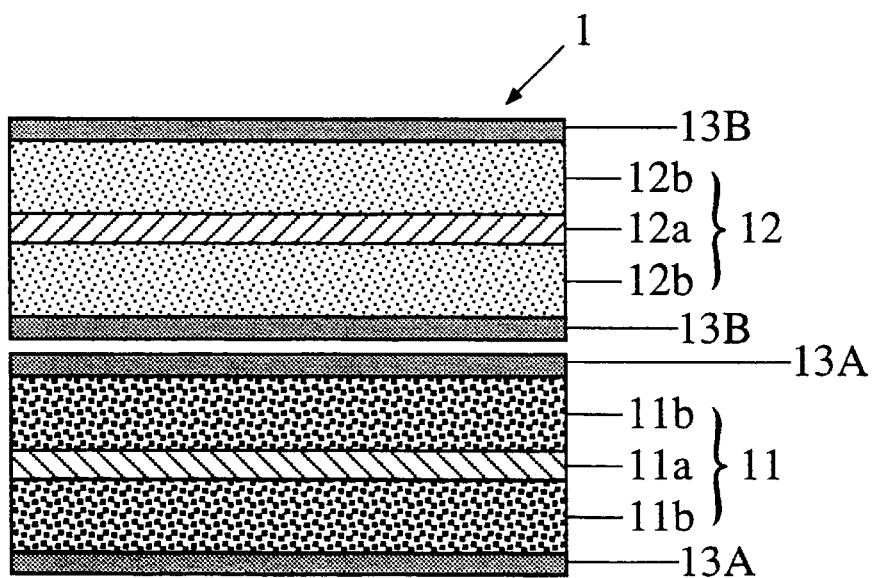
FIG. 5 is a diagrammatic cross-sectional view showing the structure of a unit cell of a battery according to still another embodiment of the present invention.

Further, the battery of the present invention may comprise a unit cell having a structure as shown in FIG. 5, in which separators 13A, 13A are formed, in an immobilized form, on the respective cathode active material layers 11b, 11b which are formed on both surfaces of current collector 11a for positive electrode 11; separators 13B, 13B are formed, in an immobilized form, on the respective anode active material layers 12b, 12b which are formed on both surfaces of current collector 12a for negative electrode 12, wherein either of cathode active material layers 11b, 11b and either of anode active material layers 12b, 12b are arranged opposite to each other through separators 13A and 13B to thereby form unit cell 1. In this instance, two separators 13A, 13A (formed on the respective cathode active material layers 11b, 11b which are formed on both surfaces of current collector 11a for positive electrode 11) may be the same or different, and two separators 13B, 13B (formed on the respective anode active material layers 12b, 12b which are formed on both surfaces of current collector 12a for negative electrode 12) may be the same or different. The battery comprising the unit cell having a structure as shown in FIG. 5 has a double-separator structure (comprised of separators 13A, 13B) formed between the cathode active material layer and the anode active material layer. Therefore, such a battery is especially advantageous for the following reason. Even when either or each of separator 13A and separator 13B of the above-mentioned double-separator structure suffers from pin hole phenomenon (i.e., a phenomenon in which holes extending along the thicknesswise direction of a separator are formed), by virtue of the above-mentioned double-separator structure, there is almost no probability that a hole formed in one of the two separators communicates to a hole formed in the other of the two separators to form a through-hole extending through both of the two separators. Therefore, the above-mentioned battery is substantially free from the danger of occurrence of a short-circuiting between cathode active material layer 11b and anode active material layer 12b.

Figure 6:
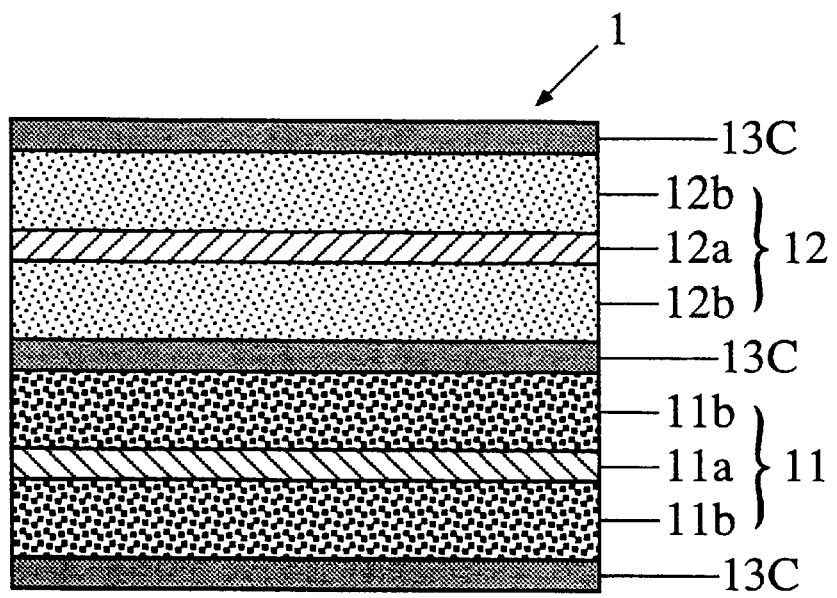
FIG. 6 is a diagrammatic cross-sectional view showing the structure of a unit cell of a battery according to still another embodiment of the present invention.

Further, the battery of the present invention may comprise a unit cell having a structure as shown in FIG. 6, in which separator 13C is formed, in an immobilized form, on both of cathode active material layer 11b and anode active material layer 12b. Examples of methods for producing separator 13C include:

a method comprising:
coating a dispersion of a mixture of particles of an insulating substance and a binder for the particles in a dispersion medium on the surface of an active material layer of an electrode selected from the positive electrode and the negative electrode,
immediately after coating the surface of the active layer with the dispersion, laminating the resultant electrode (having the active material layer thereof coated with the dispersion) to the remaining other electrode so that the cathode active material layer and the anode active material layer are arranged opposite to each other through the above-mentioned coated dispersion, and
removing, by evaporation, the dispersion medium by heating, so that separator 13C is formed, in an immobilized form, on both of the cathode active material layer and the anode active material layer;

a method comprising:
coating the above-mentioned dispersion on the surface of an active material layer of an electrode selected from the positive electrode and the negative electrode,
drying the coated dispersion to form a separator layer on the active material layer,
laminating the electrode having the active material layer (on which the separator layer is formed) to the remaining other electrode so that the cathode active material layer and the anode active material layer are arranged opposite to each other through the separator layer, to thereby obtain a laminate structure comprised of the positive electrode, the negative electrode and the separator layer disposed between the positive electrode and the negative electrode; and
pressing the obtained laminate structure by means of a hot press under temperature conditions at which the binder for the particles can be melted, so that separator 13C is formed, in an immobilized form, on both of the cathode active material layer and the anode active material layer; and a method comprising:
coating the above-mentioned dispersion on the surface of an active material layer of an electrode selected from the positive electrode and the negative electrode,
drying the coated dispersion to form a separator layer on the active material layer,
coating a solvent, which is capable of dissolving the above-mentioned binder, on the separator layer,
laminating the electrode having the active material layer (on which the separator layer is formed) to the remaining other electrode so that the cathode active material layer and the anode active material layer are arranged opposite to each other through the separator layer, to thereby obtain a laminate structure comprised of the positive electrode, the negative electrode and the separator layer disposed between the positive electrode and the negative electrode; and
pressing and heating the obtained laminate structure, so that separator 13C is formed, in an immobilized form, on both of the cathode active material layer and the anode active material layer.

Figure 7A:
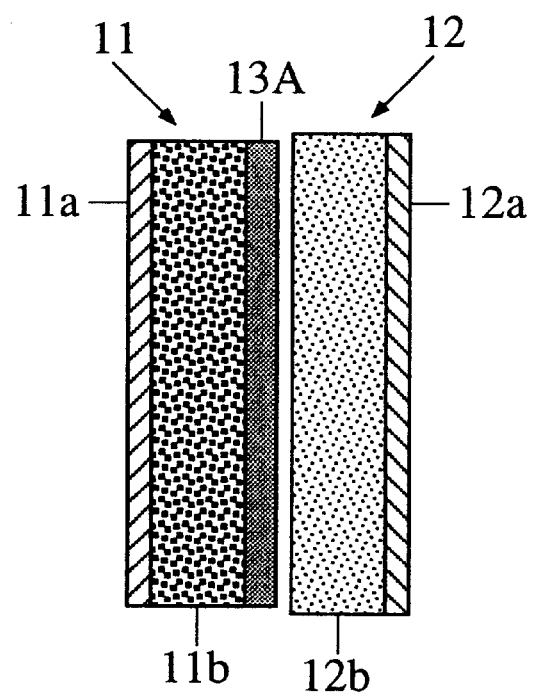
FIGS. 7(a) to 7(c) are diagrammatic cross-sectional views showing the respective structures of unit cells employed in Examples 1 to 7, respectively.
Figure 7B:
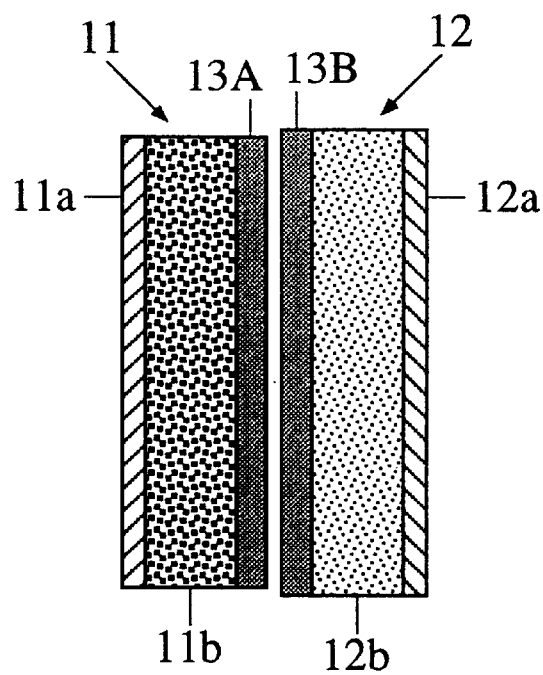
Figure 7C:
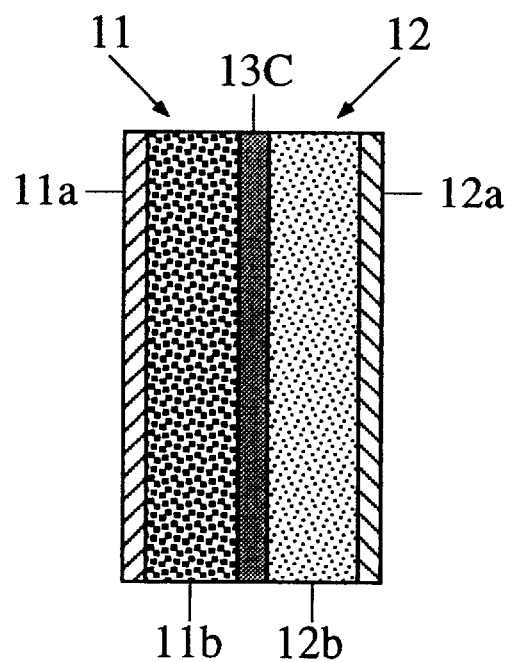

In the battery of the present invention, as shown in FIGS. 2 to 6, the unit cell may comprise a plurality of cathode active material layers and a plurality of anode active material layers. Alternatively, as shown in FIGS. 7(a) to (c) (which are referred to in the Examples below), the unit cell may comprise a single cathode active material layer and a single anode active material layer, and such a unit cell may be used in the form of a laminate structure in which a plurality of unit cells are laminated, or in the form of a spirally wound structure in which a unit cell is spirally wound.

With respect to the method for producing the battery of the present invention, there is no particular limitation. However, as a preferred example of methods for producing the battery of the present invention, there can be mentioned a method comprising:

(1) individually providing a positive electrode comprising a cathode active material layer and a negative electrode comprising an anode active material layer;

(2) coating a dispersion of a mixture of particles of an insulating substance and a binder for the particles in a dispersion medium on at least one active material layer selected from the group consisting of the cathode active material layer and the anode active material layer;

(3) removing, by evaporation, the dispersion medium of the dispersion coated on the at least one active material layer to form a layer of an aggregate of the particles, wherein the particles are bound together by means of the binder, thereby providing a porous separator formed directly, in an immobilized form, on the at least one active material layer, wherein the layer of an aggregate form of particles has a three dimensional network of voids; and (4) disposing the positive electrode and the negative electrode, at least one of which has the porous separator formed on the active material layer thereof, in a casing so that the cathode active material layer and the anode active material layer are arranged opposite to each other through the porous separator formed on the at least one active material layer, operatively with an electrolyte contained in the casing.

BEST MODE FOR CARRYING OUT THE INVENTION

Hereinbelow, the present invention will be described in detail with reference to the following Examples and Comparative Examples, which should not be construed as limiting the scope of the present invention.

EXAMPLE 1

Using sample unit cells each having a structure as shown in FIG. 7(a), the charge/discharge cycle characteristics of the battery of the present invention were examined.

Sheet electrodes were individually produced as follows.
(Positive Electrode)

$LiCoO_2$ as a cathode active material, a lamellar graphite and acetylene black, each as a filler, and a fluororubber (a copolymer of vinylidene fluoride, hexafluoropropylene and tetrafluoroethylene: manufactured and sold, under the tradename "Miraflon", by Asahi Chemical Industry Co., LTD., Japan) as a binder ($LiCoO_2$/lamellar graphite/acetylene black/fluororubber weight ratio: 100/2.5/2.5/1.96) were mixed in a mixed solvent of ethyl acetate and ethyl cellosolve (ethyl acetate/ethyl cellosolve volume ratio: 1/3) to thereby obtain a slurry for coating. The obtained slurry was applied to one surface of aluminum foil 11a (a current collector) having a thickness of 15 μm, followed by drying. The resultant coated aluminum foil was pressed by means of a calender roll, to thereby obtain positive electrode 11 having 88 μm-thick cathode active material layer 11b.
(Negative Electrode)

A needle coke as a negative active material, carboxymethyl cellulose as a dispersing agent and a styrene-butadiene latex as a binder (needle coke/carboxymethyl cellulose/styrene-butadiene latex weight ratio: 100/0.8/2.0) were mixed in purified water to thereby obtain a slurry for coating. The obtained slurry was applied to one surface of copper foil 12a (a current collector) having a thickness of 18 μm, followed by drying. The resultant coated copper foil was pressed by means of a calender roll, to thereby obtain negative electrode 12 having 124 μm-thick anode active material layer 12b.
(Aggregate Form of Particles of an Insulating Substance)

An aggregate form of particles of an insulating substance was prepared by the method described below using the materials described below.
(Materials Used)

Particles of an insulating substance: Particles of $\alpha$-$Al_2O_3$ having an average particle diameter of 0.5 μm.

Binder: A fluororubber (Miraflon, manufactured and sold by Asahi Chemical Industry Co., LTD., Japan).

Solvent: A mixed solvent of ethyl acetate and ethyl cellosolve (ethyl acetate/ethyl cellosolve volume ratio: 1/3).
(Preparation Method)

A fluororubber (Miraflon) was dissolved in a mixed solvent of ethyl acetate and ethyl cellosolve to obtain a solution having a fluororubber content of 4.3% by weight. Then, to the obtained fluororubber solution were added particles of $\alpha$-$Al_2O_3$ to obtain a slurry having a solids content of 45.3% by weight. Using a doctor blade, the obtained slurry was applied, in a predetermined uniform thickness, to the surface of cathode active material layer 11b of positive electrode 11, followed by drying in an oven at 120° C. for 15 minutes, to thereby obtain separator 13A, wherein separator 13A was composed of a layer of an aggregate form of particles of $\alpha$-$Al_2O_3$, and was directly formed, in an immobilized form, on cathode active material layer 11b. Separator 13A had a porosity of 52%. The porosity was measured by means of a mercury porosimeter (manufactured and sold by Shimadzu Corp., Japan) with respect to a sample separator prepared in substantially the same manner as in the preparation of separator 13A, except that the sample separator was formed on a dish made of an aluminum foil and then, the obtained sample separator was peeled off from the dish.

Positive electrode 11 having separator 13A (which was directly formed, in an immobilized form, on cathode active material layer 11b) was fabricated so as to have a surface area of 1.5 cm×1.0 cm. Negative electrode 12 was fabricated so as to have a surface area of 1.55 cm×1.05 cm. (These surface areas are of the face-to-face surfaces of both electrodes.)

Then, the obtained positive electrode sheet and the obtained negative electrode sheet were combined so that cathode active material layer 11b and anode active material layer 12b were arranged in a positional relationship opposite to each other through separator 13A formed on cathode active material layer 11b, to thereby obtain a sample unit cell having a structure as shown in FIG. 7(a). (Example 1-A) In the obtained sample unit cell, the thickness of separator 13A was 25 μm.

Another sample unit cell having a structure as shown in FIG. 7(b) was obtained in substantially the same manner as in Example 1-A, except that separator 13B was also formed on anode active material layer 12b. (Example 1-B) In the obtained sample unit cell of FIG. 7(b), the total thickness of the separators respectively formed on cathode active material layer 11b and on anode active material layer 12b was 50 μm. Each of the obtained sample unit cells was immersed in an electrolytic liquid which had been prepared by dissolving $LiBF_4$ in a mixed solvent of propylene carbonate (PC), ethylene carbonate (EC) and γ-butyrolactone (γ-BL) (PC/EC/γ-BL volume ratio: 1/1/2, and $LiBF_4$ concentration: 1.0 mol/liter), and the charge/discharge cycle test was conducted under the following conditions.
(Charge/Discharge Conditions)
Temperature: 25° C.
(1st Cycle)

Charge: The charging operation was conducted for 8 hours, in which the operation was started at a current density of 1.0 mA/cm² and, after the voltage of the unit cell became 4.2 V, the current density was controlled so as to maintain the voltage at 4.2 V.

Discharge: The discharging operation was conducted at a current density of 1.0 mA/cm² (corresponding to 1/3C, wherein C indicates the discharge rate (1.0C corresponds to a discharge current at which a fully charged battery can complete discharging in 1 hour)) until the voltage of the unit cell became 2.7 V.
(2nd to 15th Cycles)

Charge: The charging operation was conducted for 6 hours, in which the operation was started at a current density of 1.0 mA/cm² and, after the voltage of the unit cell became 4.2 V, the current density was controlled so as to maintain the voltage at 4.2 V.

Discharge: The discharging operation was conducted at a current density of 1.0 mA/cm² (corresponding to 1/3C) until the voltage of the unit cell became 2.7 V.
(16th and 17th Cycles)

Charge: The charging operation was conducted under substantially the same conditions as in the 2nd to 15th cycles.

Discharge: The discharging operation was conducted at a current density of 3.0 mA/cm² (corresponding to 1.0C) until the voltage of the unit cell became 2.7 V.
(18th Cycle)

Charge: The charging operation was conducted under substantially the same conditions as in the 2nd to 15th cycles.

Discharge: The discharging operation was conducted under substantially the same conditions as in the 2nd to 15th cycles.
(19th Cycle)

Charge: The charging operation was conducted under substantially the same conditions as in the 2nd to 15th cycles.

Discharge: The discharging operation was conducted at a current density of 6.0 mA/cm² (corresponding to 2.0C) until the voltage of the unit cell became 2.7 V.

Example 1-A) Another sample unit cell was obtained in substantially the same manner as in Comparative Example 1-A, except that use was made of a microporous PE film having a thickness of 34 μm and a porosity of 63% as separator 13. (Comparative Example 1-B) The porosity of each of the above-mentioned microporous PE films was calculated by the following formula:

Porosity=(total volume of pores in the microporous film/volume of the microporous film)×100 wherein the total volume of pores is the value obtained by subtracting the weight of the microporous film in the dry state thereof from the weight of the microporous film in the wet state thereof in which the microporous film is impregnated with water.

Each of the obtained sample unit cells was immersed in the same electrolytic liquid as in Example 1, and the charge/discharge cycle test was conducted under the same conditions as in Example 1. With respect to each of the obtained sample unit cells, the discharge capacity lowering ratio (%) between the 15th cycle and the 16th cycle and the discharge capacity lowering ratio (%) between the 18th cycle and the 19th cycle were calculated. Results are shown in Table 1.

TABLE 1

|  | Discharge capacity $E_{15}$ at the 15th cycle (current density: 1/3 C) (mAh) | Discharge capacity $E_{16}$ at the 16th cycle (current density: 1.0 C) (mAh) | Discharge capacity lowering ratio between the 15th cycle and the 16th cycle (%) | Discharge capacity $E_{18}$ at the 18th cycle (current density: 1/3 C) (mAh) | Discharge capacity $E_{19}$ at the 19th cycle (current density: 2.0 C) (mAh) | Discharge capacity lowering ratio between the 18th cycle and the 19th cycle (%) |
|---|---|---|---|---|---|---|
| Example 1-A | 4.326 | 4.017 | −7.1 | 4.311 | 2.354 | −45.4 |
| Example 1-B | 4.342 | 4.076 | −6.1 | 4.303 | 1.553 | −63.9 |
| Comparative Example 1-A | 4.350 | 3.959 | −9.0 | 4.337 | 1.341 | −69.1 |
| Comparative Example 1-B | 4.383 | 4.058 | −7.4 | 4.364 | 1.502 | −65.6 |

Discharge capacity lowering ratio (%) between the (n − 1)-th cycle and the n-th cycle: $[E_n - E_{(n-1)}]/E_{(n-1)} \times 100$.

With respect to each of the sample unit cells, the discharge capacity lowering ratio (%) between the 15th cycle and the 16th cycle and the discharge capacity lowering ratio (%) between the 18th cycle and the 19th cycle were calculated. Results are shown in Table 1.

COMPARATIVE EXAMPLE 1

Sample unit cells each having a structure as shown in FIG. 1(B) was prepared as follows.

Positive electrode 11 and negative electrode 12 were individually obtained in substantially the same manner as in Example 1. Positive electrode 11 and negative electrode 12 were fabricated so as to have a surface area of 1.5 cm×1.0 cm and a surface area of 1.55 cm×1.05 cm, respectively. (These surface areas are of the face-to-face surfaces of both electrodes.) Then, the obtained positive electrode sheet, the obtained negative electrode sheet and separator 13 {a microporous polyethylene (PE) film having a thickness of 25 μm and a porosity of 48%} were combined so that cathode active material layer 11b and anode active material layer 12b were arranged in a positional relationship opposite to each other through separator 13, to thereby obtain a sample unit cell having a structure as shown in FIG. 1(B). (Comparative As can be seen from Table 1, the sample unit cell obtained in Example 1-A had a markedly small discharge capacity lowering ratio (%) between the 18th cycle (in which the discharge current density was 1/3C) and the 19th cycle (in which the discharge current density was 1.0C), as compared to the sample unit cell obtained in Comparative Example 1-A in which the separator used had the same thickness as that of the separator used in Examples 1-A. That is, the battery of the present invention has improved discharge characteristics at a high current density, which are superior to those of a battery using a conventional microporous PE film separator. The reason for this is presumed to be as follows. The separator used in the present invention, which comprises a layer of an aggregate form of particles of at least one insulating substance, has a unique pore structure in which the morphology of the pores and the distribution of the pore diameters are different from those of the conventional microporous PE film separator, and the above-mentioned unique pore structure of the separator used in the present invention is more effective for achieving a high ion conductive property than the pore structure of the above-mentioned conventional separator. It is presumed that, due to such a high ion conductive property of the separator, the sample unit cell using the separator used in the present invention exhibits improved discharge characteristics at a high current density. This can be confirmed by the fact that the sample unit cell obtained in Example 1-B (which had a separator having a thickness which is much larger than those of the separators respectively obtained in Comparative Examples 1-A and 1-B), exhibited excellent discharge characteristics, as compared to the sample unit cells respectively obtained in Comparative Examples 1-A and 1-B.

Further, the sample unit cell obtained in Example 1-A has a markedly small discharge capacity lowering ratio (%) between the 18th cycle (in which the discharge current density was 1/3C) and the 19th cycle (in which the discharge current density was 2.0C), as compared to the sample unit cell obtained in Comparative Example 1-B which had a porosity which is higher than that of the separator used in the sample unit cell of Example 1-A and had a thickness which is larger than that of the separator used in the unit cell of Example 1-A. The reason for this is as follows. Although the separator used in the sample unit cell of Example 1-A had a porosity which is lower than that of the conventional separator used in the sample unit cell of Comparative Example 1-B, the separator used in the sample unit cell of Example 1-A had a thickness which is much smaller than that of the conventional separator used in the sample unit cell of Comparative Example 1-B (which necessarily has a large thickness so as to avoid breakage of the separator during the handling thereof). Due to such a small thickness of the separator, the ion conductive property of the separator was improved, so that the sample unit cell obtained in Example 1-A exhibited improved discharge characteristics at a high discharge current density.

EXAMPLE 2

Using a sample unit cell having a structure as shown in FIG. 7(b) and a sample unit cell having a structure as shown in FIG. 7(c), the charge/discharge cycle characteristics of the battery of the present invention were examined in substantially the same manner as in Example 1.

Sheet electrodes were individually produced as follows.
(Positive Electrode)
LiCoO$_2$ as a cathode active material, a lamellar graphite and acetylene black, each as a filler, and a fluororubber as a binder (LiCoO$_2$/lamellar graphite/acetylene black/fluororubber weight ratio: 100/2.5/2.5/1.96) were mixed in a mixed solvent of ethyl acetate and ethyl cellosolve (ethyl acetate/ethyl cellosolve volume ratio: 1/3) to thereby obtain a paste for coating. The obtained paste was applied to one surface of aluminum foil 11a (a current collector) having a thickness of 15 µm, followed by drying. The resultant coated aluminum foil was pressed by means of a calender roll, to thereby obtain positive electrode 11 having 87 µm-thick cathode active material layer 11b.
(Negative Electrode)
A mesophase pitch carbon fiber graphite and a lamellar graphite, each as an anode active material, carboxymethyl cellulose as a dispersing agent and a latex as a binder (mesophase pitch carbon fiber graphite/lamellar graphite/carboxymethyl cellulose/latex weight ratio: 90/10/1.4/1.8) were mixed in purified. water to thereby obtain a paste for coating. The obtained paste was applied to one surface of copper foil 12a (a current collector) having a thickness of 12 µm, followed by drying. The resultant coated copper foil was pressed by means of a calender roll, to thereby obtain negative electrode 12 having 81 µm-thick anode active material layer 12b.

(Aggregate Form of Particles of an Insulating Substance)
An aggregate form of particles of an insulating substance was prepared by the method described below using the materials described below.
(Materials Used)
Particles of an insulating substance: Particles of α-Al$_2$O$_3$ having an average particle diameter of 1.0 µm.
Binder: Polyvinylidene fluoride (PVDF) (KF#1100, manufactured and sold by Kureha Chemical Industry Co., Ltd., Japan).
Solvent: 1-methyl-2-pyrrolidone (NMP).
(Preparation Method)
Particles of α-Al$_2$O$_3$ and particles of PVDF (α-Al$_2$O$_3$/PVDF weight ratio: 100/5) were mixed with each other to obtain a powder mixture. Then, to the obtained powder mixture was added NMP to obtain a slurry having a solids content of 56.8% by weight.

Using a doctor blade, the obtained slurry was applied, in a predetermined uniform thickness, to each of the surface of cathode active material layer 11b of positive electrode 11 and the surface of anode active material layer 12b of negative electrode 12, followed by drying in an oven at 120° C. for 15 minutes, to thereby obtain separators 13A and 13B, wherein each of separators 13A and 13B was composed of a layer of an aggregate form of particles of α-Al$_2$O$_3$, and separators 13A and 13B were directly formed, in an immobilized form, on cathode active material layer 11b and anode active material layer 12b, respectively. Each of separators 13A and 13B had a porosity of 52%. The porosities of separators 13A and 13B were measured by means of a mercury porosimeter (manufactured and sold by Shimadzu Corp., Japan) with respect to sample separators prepared in substantially the same manner as in the preparation of separator 13A and the preparation of separator 13B, respectively, except that each of the sample separators was formed on a dish made of an aluminum foil and then, peeled off from the dish.

Positive electrode 11 having separator 13A (which was directly formed, in an immobilized form, on the cathode active material layer 11b) was fabricated so as to have a surface area of 1.5 cm×1.0 cm. Negative electrode 12 having separator 13B (which was directly formed, in an immobilized form, on anode active material layer 12b) was fabricated so as to have a surface area of 1.55 cm×1.05 cm. (These surface areas are of the face-to-face surface of both electrodes.)

Then, the obtained positive electrode sheet and the obtained negative electrode sheet were combined so that cathode active material layer 11b and anode active material layer 12b were arranged in a positional relationship opposite to each other through separator 13A formed on cathode active material layer 11b and separator 13B formed on anode active material layer 12b, to thereby obtain a sample unit cell having a structure as shown in FIG. 7(b). (Example 2-A) In the obtained sample unit cell, the total thickness of separators 13A and 13B respectively formed on cathode active material layer 11b and anode active material layer 12b was 25 µm.

Another sample unit cell was obtained in substantially the same manner as in Example 2-A, except that the thickness of each of separators 13A and 13B was controlled so that the total thickness of separators 13A and 13B becomes 10 µm. (Example 2-B) Using positive electrode 11, negative electrode 12 and a slurry (which is a material for the separator) each prepared in the same manner as in Examples 2-A and 2-B, still another sample unit cell having a structure as shown in FIG. 7(c) was prepared as follows. The above-mentioned slurry was applied to the surface of cathode active material layer 11b of positive electrode 11. Subsequently, positive electrode 11 and negative electrode 12 were combined so that cathode active material layer 11b and anode active material layer 12b were arranged in a positional relationship opposite to each other through the slurry coated on cathode active material layer 11b, followed by drying to remove, by evaporation, the solvent contained in the slurry, to thereby obtain a laminate structure in which separator 13C was directly formed, in an immobilized form, on each of cathode active material layer 11b and anode active material layer 12b. The laminate structure was fabricated so as to have a surface area of 1.5 cm×1.0 cm, to thereby obtain a sample unit cell having a structure as shown in FIG. 7(c). (Example 2-C) In the obtained sample unit cell, the thickness of separator 13C was 25 $\mu$m.

Each of the obtained sample unit cells was immersed in an electrolytic liquid which had been prepared by dissolving $LiPF_6$ in a mixed solvent of ethylene carbonate (EC) and diethylene carbonate (DEC) (EC/DEC volume ratio: 1/1, and $LiPF_6$ concentration: 1.0 mol/liter), and the charge/discharge cycle test was conducted under the conditions as mentioned below.

In Comparative Example 2, a sample unit cell was prepared as follows. Positive electrode 11 and negative electrode 12 were individually obtained in substantially the same manner as in Example 2-A and Example 2-B. The obtained positive electrode 11 and the obtained negative electrode 12 were fabricated so as to have a surface area of 1.5 cm×1.0 cm and a surface area of 1.55 cm×1.05 cm, respectively. (These surface areas are of the face-to-face surfaces of both electrodes.) Then, the obtained positive electrode sheet and the obtained negative electrode sheet were combined so that cathode active material layer 11b and anode active material layer 12b were arranged in a positional relationship opposite to each other through separator 13 which is a microporous polyethylene (PE) film having a thickness of 25 $\mu$m and a porosity of 36%, to thereby obtain a sample unit cell having a structure as shown in FIG. 1(B). Each of the obtained sample unit cells was immersed in the same electrolytic liquid as in Example 2, and the charge/discharge cycle test was conducted under the same conditions as in Example 2.

The porosity of the microporous PE film was calculated by the following formula:

Porosity=(total volume of pores in the microporous film/volume of the microporous film)×100 wherein the total volume of pores is the value obtained by subtracting the weight of the microporous film in the dry state thereof from the weight of the microporous film in the wet state thereof in which the microporous film is impregnated with water.

With respect to each of the sample unit cells respectively obtained in Examples 2-A, 2-B and 2-C, and Comparative Example 2, the charge/discharge cycle test was conducted under the following conditions. (Charge/discharge conditions)
Temperature: 25° C.
(1st Cycle to 10th Cycle)

Charge : The charging operation was conducted for 6 hours, in which the operation was started at a current density of 1.0 $mA/cm^2$ and, after the voltage of the unit cell became 4.2 V, the current density was controlled so as to maintain the voltage at 4.2 V.

Discharge: The discharging operation was conducted at a current density of 1.0 $mA/cm^2$ (corresponding to 1/3C) until the voltage of the unit cell became 2.7 V. (11th cycle)

Charge: The charging operation was conducted under substantially the same conditions as in the 1st to 10th cycles.

Discharge: The discharging operation was conducted at a current density of 3.0 $mA/cm^2$ (corresponding to 1.0C) until the voltage of the unit cell became 2.7 V.
(12th Cycle)

Charge: The charging operation was conducted under substantially the same conditions as in the 1st to 10th cycles.

Discharge: The discharging operation was conducted under substantially the same conditions as in the 1st to 10th cycles.
(13th Cycle)

Charge: The charging operation was conducted under substantially the same conditions as in the 1st to 10th cycles.

Discharge: The discharging operation was conducted at a current density of 6.0 $mA/cm^2$ (corresponding to 2.0C) until the voltage of the unit cell became 2.7 V.

With respect to each of the sample unit cells obtained in Examples 2-A, 2-B, 2-C and Comparative Example 2, the discharge capacity lowering ratio (%) between the 10th cycle and the 11th cycle and the discharge capacity lowering ratio (%) between the 12th cycle and the 13th cycle were calculated. Results are shown in Table 2.

TABLE 2

|  | Discharge capacity $E_{10}$ at the 10th cycle (current density: 1/3 C) (mAh) | Discharge capacity $E_{11}$ at the 11th cycle (current density: 1.0 C) (mAh) | Discharge capacity lowering ratio between the 10th cycle and the 11th cycle (%) | Discharge capacity $E_{12}$ at the 12th cycle (current density: 1/3 C) (mAh) | Discharge capacity $E_{13}$ at the 13th cycle (current density: 2.0 C) (mAh) | Discharge capacity lowering ratio between the 12th cycle and the 13th cycle (%) |
|---|---|---|---|---|---|---|
| Example 2-A | 5.027 | 4.944 | −1.7 | 5.002 | 4.695 | −6.1 |
| Example 2-B | 5.031 | 4.977 | −1.1 | 5.005 | 4.821 | −3.7 |
| Example 2-C | 5.011 | 4.933 | −1.6 | 4.993 | 4.655 | −6.9 |
| Comparative Example 2 | 5.025 | 4.925 | −2.0 | 5.000 | 4.425 | −11.5 |

Discharge capacity lowering ratio (%) between the (n − 1)-th cycle and the n-th cycle: $[E_n - E_{(n-1)}]/E_{(n-1)} \times 100$.

As can be seen from Table 2, the sample unit cell obtained in Example 2-A had a markedly small discharge capacity lowering ratio (%) between the 12th cycle (in which the discharge current density was 1/3C) and the 13th cycle (in which the discharge current density was 2.0C), as compared to the sample unit cell obtained in Comparative Example 2 in which the separator used had the same thickness as that of the separator used in Examples 2-A. That is, the battery of the present invention has improved discharge characteristics at a high current density, which are superior to those of a battery using a conventional microporous PE film separator. The reason for this is presumed to be as follows. The separator used in the present invention, which comprises a layer of an aggregate form of particles of at least one insulating substance, has a unique pore structure in which the morphology of the pores and the distribution of the pore diameters are different from those of the conventional microporous PE film separator, and the above-mentioned unique pore structure of the separator used in the present invention is more effective for achieving a high ion conductive property than the pore structure of the above-mentioned conventional separator. It is presumed that, due to such a high ion conductive property of the separator, the sample unit cell using the separator used in the present invention exhibits improved discharge characteristics at a high current density.

The sample unit cell obtained in Example 2-B exhibited even more improved discharge characteristics at a high current density than the sample unit cell obtained in Example 2-A. Such improved discharge characteristics can be presumed to be attributed to the small thickness of the separator used in the sample cell of Example 1-B, which is even smaller than the thickness of the separator used in the sample unit cell of Example 1-A.

Further, the sample unit cell obtained in Example 2-C, which has a construction in which the separator was directly formed, in an immobilized form, on each of the cathode active material layer and the anode active material layer, also exhibited improved discharge characteristics.

EXAMPLE 3

A sample unit cell was obtained in substantially the same manner as in Example 2-A (Example 3), and another sample unit cell was obtained in substantially the same manner as in Comparative Example 2 (Comparative Example 3). With respect to each of the obtained sample unit cells, the charge/discharge cycle test was conducted under the conditions as mentioned below. In Example 3 and Comparative Example 3, the charge/discharge tests were conducted in order to demonstrate that the separator used in the battery of the present invention has not only an improved ion conductive property, but also an improved durability, as compared to a conventional separator.
(Charge/Discharge Conditions)
(1st Cycle)

Charge: The charging operation was conducted for 6 hours, in which the operation was started at a current density of 1.0 mA/cm$^2$ and, after the voltage of the unit cell became 4.2 V, the current density was controlled so as to maintain the voltage at 4.2 V.

Discharge: The discharging operation was conducted at a current density of 1.0 mA/cm$^2$ (corresponding to 1/3C) until the voltage of the unit cell became 2.7 V.
(2nd to 200th Cycles)

Charge: The charging operation was conducted for 3 hours, in which the operation was started at a current density of 3.0 mA/cm$^2$ and, after the voltage of the unit cell became 4.2 V, the current density was controlled so as to maintain the voltage at 4.2 V.

Discharge: The discharging operation was conducted at a current density of 3.0 mA/cm$^2$ (corresponding to 1.0C) until the voltage became 2.7 V.

With respect to each of the sample unit cells, the discharge capacity maintaining ratio {i.e., the ratio (%) of the discharge capacity at the 200th cycle to the discharge capacity at the 2nd cycle} was calculated. As a result, it was found that the discharge capacity maintaining ratio in Example 3 was 88.8%, and that the ratio in Comparative Example 3 was 83.8%. That is, although the thickness of the separator used in the sample unit cell of Example 3 was the same as that of the separator used in the sample unit cell of Comparative Example 3, the discharge capacity maintaining ratio of the sample unit cell of Example 3 was higher than that of the sample unit cell of Comparative Example 3. From the above, it is apparent that the separator used in the battery of the present invention, which comprises a layer of an aggregate form of particles of at least one insulating substance, has improved durability, as compared to the conventional microporous PE film separator.

EXAMPLE 4

Using a sample unit cell having a structure as shown in FIG. 7(b), the charge/discharge cycle characteristics of the battery of the present invention were examined in substantially the same manner as in Examples 1 and 2.
(Electrodes)

Sheet electrodes were individually produced in substantially the same manner as in Examples 2-A, 2-B and Example 3.
(Aggregate Form of Particles of an Insulating Substance)

An aggregate form of particles of an insulating substance was prepared by the method described below using the materials described below.
(Materials Used)

Particles of an insulating substance: Zeolite having a $SiO_2/Al_2O_3$ molar ratio of 29.

Binder: Polyvinylidene fluoride (PVDF) (KF#1100, manufactured and sold by Kureha Chemical Industry Co., Ltd., Japan).

Solvent: 1-methyl-2-pyrrolidone (NMP).
(Preparation Method)

Particles of a zeolite and particles of PVDF (zeolite/PVDF weight ratio: 100/5) were mixed with each other to obtain a powder mixture. Then, to the obtained powder mixture was added NMP to obtain a slurry having a solids content of 55.0% by weight.

Using a doctor blade, the obtained slurry was applied, in a predetermined uniform thickness, to each of the surface of cathode active material layer 11b of positive electrode 11 and the surface of anode active material layer 12b of negative electrode 12, followed by drying in an oven at 120° C. for 15 minutes, to thereby obtain separators 13A and 13B, wherein each of separators 13A and 13B was comprised of a layer of an aggregate form of particles of a zeolite, and separators 13A and 13B were directly formed, in an immobilized form, on cathode active material layer 11b and anode active material layer 12b, respectively. Each of the obtained separators 13A and 13B had a porosity of 50%. The porosities of separators 13A and 13B were measured by means of a mercury porosimeter (manufactured and sold by Shimadzu Corp., Japan) with respect to sample separators prepared in substantially the same manner as in the preparation of separator 13A and the preparation of separator 13B, respectively, except that each of the sample separators was formed on a dish made of an aluminum foil and then, peeled off from the dish.

Positive electrode 11 having separator 13A (which was directly formed, in an immobilized form, on cathode active material layer 11b) was fabricated so as to have a surface area of 1.5 cm×1.0 cm. Negative electrode 12 having separator 13B (which was directly formed, in an immobilized form, on anode active material layer 12b) was fabricated so as to have a surface area of 1.55 cm×1.05 cm. (These surface areas are of the face-to-face surfaces of both electrodes.)

Then, the obtained positive electrode sheet and the obtained negative electrode sheet were combined so that cathode active material layer 11b and anode active material layer 12b were arranged in a positional relationship opposite to each other through separators 13A and 13B respectively formed on cathode active material layer 11b and anode active material layer 12b, to thereby obtain a sample unit cell having a structure as shown in FIG. 7(b). In the obtained sample unit cell, the total thickness of the separator respectively formed on cathode active material layer 11b and anode active material layer 12b was 25 μm. The obtained sample unit cell was immersed in an electrolytic liquid which had been prepared by dissolving $LiPF_6$ in a mixed solvent of ethylene carbonate (EC) and diethyl carbonate (DEC) (EC/DEC volume ratio: 1/1, $LiPF_6$ concentration: 1.0 mol/liter), and the charge/discharge cycle test was conducted under the same conditions as in Example 2. (Example 4)

With respect to the obtained sample unit cell, the discharge capacity lowering ratio (%) between the 10th cycle and the 11th cycle and the discharge capacity lowering ratio (%) between the 12th cycle and the 13th cycle were calculated. Results are shown in Table 3.

In Table 3, the data shown as the results of Comparative Example 4 are the reproduction of the results of Comparative Example 2 shown in Table 2 above.

(Aggregate Form of Particles of an Insulating Substance)

An aggregate form of particles of an insulating substance was prepared by the method described below using the materials described below.

(Materials Used)

Particles of an insulating substance: Polyparaphenylene terephthalamide.(aramide) (manufactured and sold, under the tradename "Twaron", by Nihon Aramide Kabushiki Kaisha).

Binder: Polyvinylidene fluoride (PVDF) (KF#1100, manufactured and sold by Kureha Chemical Industry Co., Ltd., Japan).

Solvent: 1-methyl-2-pyrrolidone (NMP).

(Preparation Method)

Particles of aramide and particles of PVDF (aramide/PVD weight ratio: 100/5) were mixed with each other to obtain a powder mixture. Then, to the obtained powder mixture was added NMP to obtain a slurry having a solids content of 50.0% by weight.

Using a doctor blade, the obtained slurry was applied, in a predetermined uniform thickness, to the surface of cathode active material layer 11b of positive electrode 11 and the surface of anode active material layer 12b of negative electrode 12, followed by drying in an oven at 120° C. for 15 minutes, to thereby obtain separators 13A and 13B,

TABLE 3

|  | Discharge capacity $E_{10}$ at the 10th cycle (current density: 1/3 C) (mAh) | Discharge capacity $E_{11}$ at the 11th cycle (current density: 1.0 C) (mAh) | Discharge capacity lowering ratio between the 10th cycle and the 11th cycle (%) | Discharge capacity $E_{12}$ at the 12th cycle (current density: 1/3 C) (mAh) | Discharge capacity $E_{13}$ at the 13th cycle (current density: 2.0 C) (mAh) | Discharge capacity lowering ratio between the 12th cycle and the 13th cycle (%) |
| --- | --- | --- | --- | --- | --- | --- |
| Example 4 | 5.040 | 4.960 | −1.6 | 5.009 | 4.771 | −4.8 |
| Comparative Example 4 | 5.025 | 4.925 | −2.0 | 5.000 | 4.425 | −11.5 |

As can be seen from Table 3, the sample unit cell obtained in Example 4 had a markedly small discharge capacity lowering ratio (%) between the 12th cycle (in which the discharge current density was 1/3C) and the 13th cycle (in which the discharge current density was 2.0C), as compared to the sample unit cell obtained in Comparative Example 4 in which the separator used had the same thickness as that of the separator used in Example 4. That is, the battery of the present invention has improved discharge characteristics at a high current density, which are superior to those of a battery using a conventional microporous PE film separator. As already mentioned above, the reason for this is presumed to reside in that the separator used in the present invention has a unique pore structure which is more effective for achieving a high ion conductive property than the pore structure of the above-mentioned conventional separator, and that, due to such an improved ion conductivity of the separator, the sample unit cell using the separator of the present invention exhibits improved discharge characteristics at a high current density.

EXAMPLE 5

Using a sample unit cell having a structure as shown in FIG. 7(b), the charge/discharge cycle characteristics of the battery of the present invention were examined in substantially the same manner as in Examples 1, 2 and 4.
(Electrodes)

Sheet electrodes were individually produced in substantially the same manner as in Examples 2, 3 and 4.

wherein each of separators 13A and 13B was comprised of a layer of an aggregate form of particles of aramide, and separators 13A and 13B were directly formed, in an immobilized form, on cathode active material layer 11b and anode active material layer 12b, respectively. Each of the separators had a porosity of 50%. The porosities of separators 13A and 13B were measured by means of a mercury porosimeter (manufactured and sold by Shimadzu Corp., Japan) with respect to sample separators prepared in substantially the same manner as in the preparation of separator 13A and the preparation of separator 13B, respectively, except that each of the sample separators was formed on a dish made of an aluminum foil and then, peeled off from the dish.

Positive electrode 11 having separator 13A (which was directly formed, in an immobilized form, on cathode active material layer 11b) was fabricated so as to have a surface area of 1.5 cm×1.0 cm. Negative electrode 12 having separator 13B (which was directly formed, in an immobilized form, on anode active material layer 12b) was fabricated so as to have a surface area of 1.55 cm×1.05 cm. (These surface areas are of the face-to-face surfaces of both electrodes.)

Then, the obtained positive electrode sheet and the obtained negative electrode sheet were combined so that cathode active material layer 11b and anode active material layer 12b were arranged in a positional relationship opposite to each other through separators 13A and 13B respectively formed on cathode active material layer 11b and anode active material layer 12b, to thereby obtain a sample unit cell having a structure as shown in FIG. 7(b). In the obtained sample unit cell, the total thickness of the separator respectively formed on cathode active material layer 11b and anode active material layer 12b was 25 μm. The obtained sample unit cell was immersed in an electrolytic liquid which had been prepared by dissolving $LiPF_6$ in a mixed solvent of ethylene carbonate (EC) and diethyl carbonate (DEC) (EC/DEC volume ratio: 1/1, $LiPF_6$ concentration: 1.0 mol/liter), and the charge/discharge cycle test was conducted under the same conditions as in Examples 2 and 4. (Example 5)

With respect to the sample unit cell, the discharge capacity lowering ratio (%) between the 10th cycle and the 11th cycle and the discharge capacity lowering ratio (%) between the 12th cycle and the 13th cycle were calculated. Results are shown in Table 4.

In Table 4, the data shown as the results of Comparative Example 5 are the reproduction of the results of Comparative Example 2 shown in Table 2 above.

Using a doctor blade, the obtained slurry was applied, in a predetermined uniform thickness, to the surface of cathode active material layer 11b of positive electrode 11, followed by drying in an oven at 120° C. for 15 minutes, to thereby obtain separator 13A, wherein separator 13A was comprised of a layer of an aggregate form of particles of $\alpha$-$Al_2O_3$, and was directly formed, in an immobilized form, on cathode active material layer 11b. Separator 13A had a porosity of 52%. The porosity was measured by means of a mercury porosimeter (manufactured and sold by Shimadzu Corp., Japan) with respect to a sample separator prepared in substantially the same manner as in the preparation of separator 13A, except that the sample separator was formed on a dish made of an aluminum foil and then, the obtained sample separator was peeled off from the dish.

Positive electrode 11 having separator 13A (which was comprised of an aggregate form of particles of $\alpha$-$Al_2O_3$, and directly formed, in an immobilized form, on cathode active material layer 11b) was fabricated so as to have a surface area of 1.5 cm×1.0 cm.

TABLE 4

|  | Discharge capacity $E_{10}$ at the 10th cycle (current density: 1/3 C) (mAh) | Discharge capacity $E_{11}$ at the 11th cycle (current density: 1.0 C) (mAh) | Discharge capacity lowering ratio between the 10th cycle and the 11th cycle (%) | Discharge capacity $E_{12}$ at the 12th cycle (current density: 1/3 C) (mAh) | Discharge capacity $E_{13}$ at the 13th cycle (current density: 2.0 C) (mAh) | Discharge capacity lowering ratio between the 12th cycle and the 13th cycle (%) |
| --- | --- | --- | --- | --- | --- | --- |
| Example 5 | 5.027 | 4.944 | −1.7 | 5.003 | 4.766 | −4.7 |
| Comparative Example 5 | 5.025 | 4.925 | −2.0 | 5.000 | 4.425 | −11.5 |

As can be seen from Table 4, the sample unit cell obtained in Example 5 had a markedly small discharge capacity lowering ratio (%) between the 12th cycle (in which the discharge current density was 1/3C) and the 13th cycle (in which the discharge current density was 2.0C), as compared to the sample unit cell of Comparative Example 5 in which the separator used had the same thickness as that of the separator used in Example 5.

EXAMPLE 6

Using a sample unit cell having a structure as shown in FIG. 7(b), the charge/discharge cycle characteristics of the battery of the present invention were examined in substantially the same manner as in Examples 1, 2, 4 and 5.
(Electrodes)
Sheet electrodes were individually produced in substantially the same manner as in Examples 2, 3, 4 and 5.
(Aggregate Form of Particles of an Insulating Substance)
An aggregate form of particles of an insulating substance was prepared by the method described below using the materials described below.
(Materials for the Positive Electrode)
Particles of an insulating substance: Particles of $\alpha$-$Al_2O_3$ having an average particle diameter of 1.0 pm.
Binder: Polyvinylidene fluoride (PVDF) (KF#1100, manufactured and sold by Kureha Chemical Industry Co., Ltd., Japan).
Solvent: 1-methyl-2-pyrrolidone (NMP). (Preparation method)
Particles of $\alpha$-$Al_2O_3$ and particles of PVDF ($\alpha$-$Al_2O_3$/PVDF weight ratio: 100/5) were mixed with each other to obtain a powder mixture. Then, to the obtained powder mixture was added NMP to obtain a slurry having a solids content of 56.8% by weight.

(Materials for the Negative Electrode)
Particles of an insulating substance: Polyethylene.
Binder: Carboxymethyl cellulose and latex.
Solvent: Purified water.
(Preparation Method)
Carboxymethyl cellulose was dissolved in purified water to obtain an aqueous solution having a carboxymethyl cellulose content of 2.0% by weight. Then, to the obtained aqueous solution of carboxymethyl cellulose were added the particles of polyethylene, and then a latex having a solids content of 4.2% by weight, to obtain a slurry (polyethylene/carboxymethyl cellulose/latex weight ratio: 100/1/2, solids content: 45.0% by weight).

Using a doctor blade, the obtained slurry was applied, in a predetermined uniform thickness, to the surface of anode active material layer 12b of negative electrode 12, followed by drying in an oven at 100° C. for 15 minutes, to thereby obtain separator 13B, wherein separator 13B was comprised of a layer of an aggregate form of particles of polyethylene, and was directly formed, in an immobilized form, on anode active material layer 12b. Separator 13B had a porosity of 50%. The porosity was measured by means of a mercury porosimeter (manufactured and sold by Shimadzu Corp., Japan) with respect to a sample separator prepared in substantially the same manner as in the preparation of separator 13B, except that the sample separator was formed on a dish made of an aluminum foil and then, the obtained sample separator was peeled off from the dish.

Negative electrode 12 having separator 13B (which was composed of an aggregate form of particles of polyethylene, and directly formed, in an immobilized form, on anode active material layer 12b) was fabricated so as to have a surface area of 1.55 cm×1.05 cm. (The surface areas of separators 13A and 13B are of the face-to-face surfaces of both electrodes.)

Then, the obtained positive electrode sheet and the obtained negative electrode sheet were combined so that cathode active material layer 11b and anode active material layer 12b were arranged in a positional relationship opposite to each other through separators 13A and 13B respectively formed on cathode active material layer 11b and anode active material layer 12b, to thereby obtain a sample unit cell having a structure as shown in FIG. 7(b). In the obtained sample unit cell, the total thickness of the separator respectively formed on cathode active material layer 11b and anode active material layer 12b was 25 μm. Each of the obtained sample unit cells was immersed in an electrolytic liquid which had been prepared by dissolving $LiPF_6$ in a mixed solvent of ethylene carbonate (EC) and diethyl carbonate (DEC) (EC/DEC volume ratio: 1/1, $LiPF_6$ concentration: 1.0 mol/liter), and the charge/discharge cycle test was conducted under the same conditions as in Examples 2, 4 and 5. (Example 6)

With respect to the sample unit cell, the discharge capacity lowering ratio (%) between the 10th cycle and the 11th cycle and the discharge capacity lowering ratio (%) between the 12th cycle and the 13th cycle were calculated. Results are shown in Table 5.

In Table 5, the data shown as the results of Comparative Example 6 are the reproduction of the results of Comparative Example 2 shown in Table 2 above.

prises a layer of particles of an inorganic compound having a high melting point (2055° C.) and separator 13B (formed on anode active material layer 12a) comprises a layer of particles of a synthetic resin having a low melting point (140° C.), the double-separator structure also functions as a fuse. That is, when a battery having such a double-separator structure is caused to have a high temperature, only the resin particles contained in separator 13B are melted and the resultant molten resin closes the voids of separator 13A to thereby shut off the current (i.e., the double-separator structure functions as a fuse).

EXAMPLE 7

Using a sample unit cell having a structure as shown in FIG. 7(b), the charge/discharge cycle characteristics of the battery of the present invention were examined in substantially the same manner as in Examples 1, 2, 4, 5 and 6.

Sheet electrodes were individually produced as follows.
(Positive Electrode)

$LiMn_2O_4$ as a cathode active material, a lamellar graphite as a filler and a fluororubber as a binder ($LiMn_2O_4$/lamellar graphite/fluororubber weight ratio: 100/6/1.96) were mixed in a mixed solvent of ethyl acetate and ethyl cellosolve (ethyl acetate/ethyl cellosolve volume ratio: 1/3) to thereby obtain a paste for coating. The obtained paste was applied to one surface of aluminum foil 11a (a current collector) having a thickness of 15 μm, followed by drying. The resultant coated aluminum foil was pressed by means of a

TABLE 5

| | Discharge capacity $E_{10}$ at the 10th cycle (current density: 1/3 C) (mAh) | Discharge capacity $E_{11}$ at the 11th cycle (current density: 1.0 C) (mAh) | Discharge capacity lowering ratio between the 10th cycle and the 11th cycle (%) | Discharge capacity $E_{12}$ at the 12th cycle (current density: 1/3 C) (mAh) | Discharge capacity $E_{13}$ at the 13th cycle (current density: 2.0 C) (mAh) | Discharge capacity lowering ratio between the 12th cycle and the 13th cycle (%) |
|---|---|---|---|---|---|---|
| Example 6 | 5.016 | 4.923 | −1.9 | 4.998 | 4.732 | −5.3 |
| Comparative Example 6 | 5.025 | 4.925 | −2.0 | 5.000 | 4.425 | −11.5 |

As can be seen from Table 5, the sample unit cell obtained in Example 6 had a markedly small discharge capacity lowering ratio (%) between the 12th cycle (in which the discharge current density was 1/3C) and the 13th cycle (in which the discharge current density was 2.0C), as compared to the sample unit cell obtained in Comparative Example 6 in which the separator used had the same thickness as that of the separator used in Examples 5. That is, the battery of the present invention has improved discharge characteristics at a high current density, which are superior to those of a battery using a conventional microporous PE film separator. As already mentioned above, the reason for this is presumed to reside in that the separator used in the present invention has a unique pore structure which is more effective for achieving a high ion conductive property than the pore structure of the above-mentioned conventional separator, and that, due to such an improved ion conductivity of the separator, the sample unit cell using the separator used in the present invention exhibits improved discharge characteristics at a high current density.

Further, in the case of the sample unit cell of Example 6, which has a double-separator structure (comprised of separator 13A and separator 13B) formed between positive electrode 11 and negative electrode 12, in which separator 13A (formed on cathode active material layer 11a) comcalender roll, to thereby obtain positive electrode 11 having a 112 μm-thick cathode active material layer 11b.

(Negative Electrode)

A mesophase pitch carbon fiber graphite and a lamellar graphite, each as an anode active material, carboxymethyl cellulose as a dispersing agent, a latex as a binder (mesophase pitch carbon fiber graphite/lamellar graphite/carboxymethyl cellulose/latex weight ratio: 90/10/1.4/1.8) were mixed in purified water to thereby obtain a paste for coating. The obtained paste was applied to one surface of copper foil 12a (a current collector) having a thickness of 12 μm, followed by drying. The resultant coated copper foil was pressed by means of a calender roll, to thereby obtain negative electrode 12 having 81 μm-thick anode active material layer 12b.

(Aggregate Form of Particles of an Insulating Substance)

An aggregate form of particles of an insulating substance was prepared by the method described below using the materials described below.

(Materials Used)

Particles of an insulating substance: Particles of α-$Al_2O_3$ having an average particle diameter of 1.0 μm.

Binder: Polyvinylidene fluoride (PVDF) (KF#1100, manufactured and sold by Kureha Chemical Industry Co., Ltd., Japan).

Solvent: 1-methyl-2-pyrrolidone (NMP).

(Preparation Method)

Particles of $\alpha$-$Al_2O_3$ and particles of PVDF ($\alpha$-$Al_2O_3$/PVD weight ratio: 100/5) were mixed with each other to obtain a powder mixture. Then, to the obtained powder mixture was added NMP to obtain a slurry having a solids content of 56.8% by weight.

Using a doctor blade, the obtained slurry was applied, in a predetermined uniform thickness, to each of the surface of cathode active material layer 11b of positive electrode 11 and the surface of anode active material layer 12b of negative electrode 12, followed by drying in an oven at 120° C. for 15 minutes, to thereby obtain separators 13A and 13B, wherein each of separators 13A and 13B was composed of a layer of an aggregate form of particles of $\alpha$-$Al_2O_3$, and separators 13A and 13B were directly formed, in an immobilized form, on cathode active material layer 11b and anode active material layer 12b, respectively. Each of separators 13A and 13B had a porosity of 52%. The porosities of separators 13A and 13B were measured by means of a mercury porosimeter (manufactured and sold by Shimadzu Corp., Japan) with respect to sample separators prepared in substantially the same manner as in the preparation of separator 13A and the preparation of separator 13B, respectively, except that each of the sample separators was formed on a dish made of an aluminum foil and then, peeled off from the dish. Positive electrode 11 having separator 13A (which was directly formed, in an immobilized form, on the cathode active material layer 11b) was fabricated so as to have a surface area of 1.5 cm×1.0 cm. Negative electrode 12 having separator 13B (which was directly formed, in an immobilized form, on anode active material layer 12b) was fabricated so as to have a surface area of 1.55 cm×1.05 cm. (These surface areas are of the face-to-face surfaces of both electrodes.)

Then, the obtained positive electrode sheet and the obtained negative electrode sheet were combined so that cathode active material layer 11b and anode active material layer 12b were arranged in a positional relationship opposite to each other through separator 13A formed on cathode active material layer 11b and separator 13B formed on anode active material layer 12b, to thereby obtain a sample unit cell having a structure as shown in FIG. 7(b). In the obtained sample unit cell, the total thickness of the separators respectively formed on cathode active material layer 11b and anode active material layer 12b was 25 $\mu$m. The obtained sample unit cell was immersed in an electrolytic liquid which had been prepared by dissolving $LiPF_6$ in a mixed solvent of ethylene carbonate (EC) and diethyl carbonate (DEC) (EC/DEC volume ratio: 1/1, and $LiPF_6$ concentration: 1.0 mol/liter), and the charge/discharge cycle test was conducted under the same conditions as in Examples 2, 4, 5 and 6. (Example 7)

In Comparative Example 7, a sample unit cell was prepared as follows. Positive electrode 11 and negative electrode 12 were individually obtained in substantially the same manner as in Example 7. The obtained positive electrode 11 and negative electrode 12 were fabricated so as to have a surface area of 1.5 cm×1.0 cm and a surface area of 1.55 cm×1.05 cm, respectively. (These surface areas are of the face-to-face surface of both electrodes.) Then, the obtained positive electrode sheet, the obtained negative electrode sheet and separator 13 (a microporous polyethylene (PE) film having a thickness of 25 $\mu$m and a porosity of 36%) were combined so that cathode active material layer 11b and anode active material layer 12b were arranged in a positional relationship opposite to each other through separator 13 to thereby obtain a sample unit cell having the structure as shown in FIG. 1(B). The obtained sample unit cell was immersed in the same electrolytic liquid as in Example 2, and the charge/discharge cycle test was conducted under the same conditions as in Example 2.

With respect to each of the sample unit cell obtained in Example 7 and the sample unit cell obtained in Comparative Example 7, the discharge capacity lowering ratio (%) between the 10th cycle and the 11th cycle and the discharge capacity lowering ratio (%) between the 12th cycle and the 13th cycle were calculated. Results are shown in Table 6.

TABLE 6

|  | Discharge capacity $E_{10}$ at the 10th cycle (current density: 1/3 C) (mAh) | Discharge capacity $E_{11}$ at the 11th cycle (current density: 1.0 C) (mAh) | Discharge capacity lowering ratio between the 10th cycle and the 11th cycle (%) | Discharge capacity $E_{12}$ at the 12th cycle (current density: 1/3 C) (mAh) | Discharge capacity $E_{13}$ at the 13th cycle (current density: 2.0 C) (mAh) | Discharge capacity lowering ratio between the 12th cycle and the 13th cycle (%) |
|---|---|---|---|---|---|---|
| Example 7 | 4.957 | 4.755 | −4.1 | 4.925 | 4.451 | −9.6 |
| Comparative Example 7 | 4.949 | 4.639 | −6.3 | 4.910 | 4.009 | −81.4 |

As can be seen from Table 6, the sample unit cell obtained in Example 7 had a markedly small discharge capacity lowering ratio (%) between the 12th cycle (in which the discharge current density was 1/3C) and the 13th cycle (in which the discharge current density was 2.0C), as compared to the sample unit cell obtained in Comparative Example 7 in which the separator used had the same thickness as that of the separator used in Example 7. That is, the battery of the present invention has improved discharge characteristics at a high current density, which are superior to those of a battery using a conventional microporous PE film separator. As already mentioned above, the reason for this is presumed to reside in that the separator used in the present invention has a unique pore structure which is more effective for achieving a high ion conductive property than the pore structure of the above-mentioned conventional separator, so that, due to such an improved ion conductivity of the separator, the sample unit cell using the separator used in the present invention exhibits improved discharge characteristics at a high discharge current density.

INDUSTRIAL APPLICABILITY

The battery of the present invention is advantageous not only in that the battery exhibits excellent discharge characteristics even at a high discharge current density without sacrificing safety, but also in that a large amount of active material can be accommodated in the battery per unit volume thereof, as compared to the amounts in the case of conventional batteries, so that the battery of the present invention can exhibit an extremely high performance, as compared to conventional batteries. Further, the battery of the present invention can exhibit such a high performance even in a compact and lightweight form.

What is claimed is:

1. A non-aqueous secondary battery comprising:
   a casing,
   a non-aqueous electrolyte contained in said casing,
   a positive electrode comprising a cathode active material layer which comprises a lithium-containing composite metal oxide selected from the group consisting of a composite metal oxide of lithium and a transition metal, and a composite metal oxide of lithium, a transition metal and a non-transition metal,
   a negative electrode comprising an anode active material layer which comprises a carbonaceous material, and
   a sole porous separator disposed between said positive electrode and said negative electrode, wherein two opposite surfaces of said sole porous separator face said cathode active material layer and said anode active material layer, respectively,
   said positive electrode, said negative electrode and said sole porous separator being disposed in said casing, operatively with said non-aqueous electrolyte,
   said sole porous separator comprising at least one layer of an aggregate form of particles of at least one insulating substance and a binder which is mixed with said particles to thereby bind said particles together, wherein said porous separator is directly formed, in an immobilized form, on at least one active material layer selected from the group consisting of said cathode active material layer and said anode active material layer, and wherein said at least one layer of the aggregate form of particles has a three-dimensional network of voids which function as pores in said porous separator and which contain therein said non-aqueous electrolyte, said voids being capable of passing ions through the non-aqueous electrolyte contained therein.

2. The non-aqueous secondary battery according to claim 1, wherein said porous separator has a porosity of 10% or more as measured in the dry state of said porous separator.

3. The non-aqueous battery according to claim 1, wherein said porous separator further has an ion conductive property obtained by a method selected from the group consisting of following methods (A) to (D):
   (A) method in which porous particles of at least one insulating substance are employed;
   (B) method in which use is made of particles of at least one insulating substance which has, in a skeletal structure thereof, voids which allow the molecules of said electrolyte to pass therethrough;
   (C) method in which use is made of particles of a material which is swellable with an electrolytic liquid, wherein said swellable material is said at least one insulating substance, a substance other than said insulating substance or a combination of said insulating substance and said other substance, said other substance being used in the form of a mixture with said insulating substance; and
   (D) method in which use is made of particles of a material which is obtained by impregnating a solid with a solution of an electrolyte in a solvent, and removing the solvent by evaporation from the impregnated solid, wherein said material is said at least one insulating substance, a substance other than said insulating substance or a combination of said insulating substance and said other substance, said other substance being used in the form of a mixture with said insulating substance.

4. The non-aqueous secondary battery according to claim 1, wherein said insulating substance is an inorganic substance.

5. The battery according to claim 4, wherein the inorganic substance is selected from the group consisting of $Li_2O$, $BeO$, $B_2O_3$, $Na_2O$, $MgO$, $Al_2O_3$, $SiO_2$, $P_2O_5$, $CaO$, $Cr_2O_3$, $Fe_2O_3$, $ZnO$, $ZrO_2$, $TiO_2$, $BN$, $AlN$, $Si_3N_4$, $Ba_3N_2$, $MgCO_3$, $CaCO_3$, $CaSO_4$, $BaSO_4$, $MgO.SiO_2$, $2MgO.SiO_2$, $2MgO.2Al_2O_3.5SiO_2$ and $M_{2/n}O.Al_2O_3.xSiO_2.yH_2O$ wherein M represents Na, K, Ca or Ba, n is a number corresponding to an electric charge of positive ion $M^{n+}$ of the metal atom M, x is a molar number of $SiO_2$ and y is a molar number of $H_2O$.

6. The non-aqueous secondary battery according to claim 1, wherein said insulating substance is an organic substance.

7. The battery according to claim 6, wherein the organic substance is selected from the group consisting of polyethylene, polypropylene, polystyrene, polyvinyl chloride, polyvinylidene chloride, polyacrylonitrile, polymethyl methacrylate, polyacrylate, polytetrafluoroethylene, polyvinylidene fluoride, polyamide resin, polyimide resin, polyester resin, polycarbonate resin, polyphenylene oxide resin, silicone resin, phenolic resin, urea resin, melamine resin, polyurethane resin, polyethylene oxide, polypropylene oxide, epoxy resin, acetal resin, acrylonitrile-styrene resin, and acrylonitrile-butadiene-styrene resin.

8. The non-aqueous secondary battery according to claim 1; wherein said aggregate form of particles comprises particles of at least two different insulating substances.

9. The non-aqueous secondary battery according to claim 1, wherein said porous separator comprises at least two layers respectively comprised of different aggregate forms of particles.

10. The non-aqueous secondary battery according to any one of claims 1 to 4, 6, 8 and 9 wherein said separator comprises a first separator layer comprising at least one layer of an aggregate form of particles of at least one inorganic insulating substance and a second separator layer comprising at least one layer of an aggregate form of particles of at least one organic insulating substance, said first separator layer being directly formed, in an immobilized form, on one active material layer selected from said cathode active material layer and said anode active material layer, said second separator layer being directly formed, in an immobilized form, on the other active material layer.

11. The non-aqueous secondary battery according to claim 1, wherein said non-aqueous electrolyte contains lithium ions.

12. The non-aqueous secondary battery according to claim 1, wherein said cathode active material layer comprises lithium manganate.

13. The battery according to claim 1, wherein the porous separator has a thickness of about 100 nm to about 100 $\mu$m.

14. The battery according to claim 1, wherein the binder comprises styrene-butadiene copolymer latex, acrylonitrile-butadiene copolymer latex, a sodium salt of carboxymethylcellulose, fluororubber, polyvinylidene fluoride or polytetrafluforoethylene.

15. The battery according to claim 1, wherein a ratio of the binder to the particles of at least one insulating substance is from about 1/500 to 5/3 by volume.

16. A method for producing a non-aqueous secondary battery, comprising:
(1) individually providing a positive electrode comprising a cathode active material layer and a negative electrode comprising an anode active material layer,
said cathode active material layer comprising a lithium-containing composite metal oxide selected from the group consisting of a composite metal oxide of lithium and a transition metal, and a composite metal oxide of lithium, a transition metal and a non-transition metal,
said anode active material layer comprising a carbonaceous material;
(2) coating a dispersion of a mixture of particles of at least one insulating substance and a binder for said particles in a dispersion medium on at least one active material layer selected from the group consisting of said cathode active material layer and said anode active material layer;
(3) removing, by evaporation, the dispersion medium of said dispersion coated on said at least one active material layer to form a layer of an aggregate form of said particles, wherein said particles are bound together by means of said binder, thereby providing a porous separator formed directly, in an immobilized form, on said at least one active material layer, wherein said layer of an aggregate form of particles has a three dimensional network of voids which function as pores in said porous separator and which are capable of accommodating therein a non-aqueous electrolyte; and
(4) disposing said positive electrode and said negative electrode, at least one of which has the porous separator formed on the active material layer thereof, in a casing so that said cathode active material layer and said anode active material layer are arranged, operatively with a non-aqueous electrolyte which is contained in said casing and contained in the voids of said porous separator, in a positional relationship opposite to each other through a sole separator which consists of said porous separator formed on said at least one active material layer.

* * * * *